(12) United States Patent
Chazot et al.

(10) Patent No.: US 10,713,185 B2
(45) Date of Patent: Jul. 14, 2020

(54) WIRELESS COMMUNICATION WITH PERIPHERAL DEVICE

(71) Applicant: Logitech Europe S.A., Lausanne (CH)

(72) Inventors: Philippe Chazot, Saint-Jorioz (FR);
Frédéric Fortin, Annemasse (FR);
Fabrice Sauterel, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/036,734

(22) Filed: Jul. 16, 2018

(65) Prior Publication Data
US 2020/0019517 A1    Jan. 16, 2020

(51) Int. Cl.
*G06F 1/10* (2006.01)
*G06F 13/10* (2006.01)
*G06F 1/12* (2006.01)

(52) U.S. Cl.
CPC .............. *G06F 13/102* (2013.01); *G06F 1/12* (2013.01)

(58) Field of Classification Search
CPC ........................................................ G06F 1/12
See application file for complete search history.

(56) References Cited

U.S. PATENT DOCUMENTS

| | | | | |
|---|---|---|---|---|
| 5,339,395 A | * | 8/1994 | Pickett | G06F 13/385 370/463 |
| 10,430,225 B1 | * | 10/2019 | Harland | G06F 13/4286 |
| 2005/0210128 A1 | * | 9/2005 | Cannon | G06F 11/3476 709/224 |
| 2012/0066418 A1 | * | 3/2012 | Foster | G06F 1/12 710/61 |
| 2012/0197729 A1 | * | 8/2012 | Bertram | G06Q 30/02 705/14.64 |
| 2016/0308540 A1 | * | 10/2016 | Subramanian | G06F 13/1689 |
| 2017/0075852 A1 | * | 3/2017 | Mishra | G06F 13/4282 |

* cited by examiner

*Primary Examiner* — Farley Abad
(74) *Attorney, Agent, or Firm* — Kilpatrick Townsend & Stockton LLP

(57) ABSTRACT

Examples of techniques for wireless communication are presented. In some examples, an apparatus comprises a wireless transceiver and a hardware processor configured to perform: receiving, from a host device, a first indication of a host device clock signal, the apparatus and the host device being coupled via a wired interconnect; determining, based on the first indication and a second indication of an endpoint device clock signal, a phase relationship between the host device clock signal and the endpoint device clock signal; determining, based at least on the phase relationship, a first time for transmitting a sensor data request to a peripheral device of a computer; transmitting, using the wireless transceiver, the sensor data request to the peripheral device at the first time; receiving, from the peripheral device, the sensor data; and providing the sensor data to the host device via the wired interconnect as input data to the computer.

17 Claims, 15 Drawing Sheets

WIRELESS COMMUNICATION WITH PERIPHERAL DEVICE

BACKGROUND

Peripheral devices can be used to interface human and computer. Some common peripheral devices include keyboards, computer mice, image scanners, speakers, microphones, web cameras, and more. These peripheral devices can be connected with the computer processor via a wired interconnect such as, for example, Universal Serial Bus (USB), DisplayPort, etc. Wired connection can be provided between the peripheral device and interface ports of the high speed serial interconnect to enable the computer processor to communicate with the peripheral devices.

The advent of wireless technology allows the wired connection to be replaced with reliable and high bandwidth wireless channels. For example, a USB dongle can be provided to enable a wireless peripheral device (e.g., a wireless computer mouse) to communicate wirelessly with a computer processor. The USB dongle may include a wireless interface to communicate with the wireless peripheral device. The USB dongle can also connected to a USB port of the computer, and can communicate with the computer processor via a USB host device and a USB bus. The wireless peripheral device can then communicate with the computer processor via the USB dongle.

By providing wireless connection between the peripheral devices and the computers, the utility of the peripheral devices can be further improved. For example, wired connection can hinder the movement of a computer mouse. By getting rid of the wired connection, a wireless computer mouse can become more nimble and take less effort to operate. Moreover, the computer can also become more responsive in adjusting its display (e.g., the location of the mouse cursor, a response to the user's selection using the mouse, etc.), which can be critical for software applications which demand sharp interactions between the user (e.g., gaming, instrument control, etc.) and the system. All these can improve the productivity of the user as well as user experiences.

BRIEF SUMMARY

In some examples, an apparatus comprises a wireless transceiver, a memory device that stores a set of instructions, and a hardware processor. The hardware processor is configured to execute the set of instructions to perform: receiving, from a host device, a first indication of a host device clock signal, the apparatus and the host device being coupled via a wired interconnect; determining, based on the first indication and a second indication of an endpoint device clock signal, a phase relationship between the host device clock signal and the endpoint device clock signal; determining, based at least on the phase relationship, a first time for transmitting a sensor data request to a peripheral device of a computer; transmitting, using the wireless transceiver, the sensor data request to the peripheral device at the first time; receiving, from the peripheral device, the requested sensor data; and providing the requested sensor data to the host device via the wired interconnect as input data to the computer.

In some aspects, the hardware processor is further configured to perform: determining, based on the host device clock signal, a second time when the apparatus is to receive a read request from the host device for the sensor data, wherein the first time for acquiring the sensor data from the peripheral device is determined such that the sensor data is acquired by the apparatus before the second time.

In some aspects, the first indication of the host device clock signal is received at a third time. The first time for transmitting the sensor data request is determined based on the third time and a pre-determined delay between when the apparatus initiates the acquisition of the sensor data and when the sensor data becomes available at the apparatus for transfer over the wired interconnect.

In some aspects, transmitting the sensor data request to the peripheral device comprises transmitting, by the apparatus to the peripheral device using the wireless transceiver, a poll request. The hardware processor is further configured to perform: receiving, from the peripheral device, and using the wireless transceiver, a poll response including the sensor data; and processing the poll response to extract the sensor data.

In some aspects, transmitting the poll request to the peripheral device at the first time enables the peripheral device to determine at least one of: a third time of acquiring next sensor data, or a fourth time of monitoring for a next poll request from the peripheral device for transmission of the next sensor data.

In some aspects, the poll request further includes accuracy information of the host device clock signal to determine the at least one of the third time of acquiring next sensor data or the fourth time of monitoring for a next poll request from the peripheral device.

In some aspects, the hardware processor is further configured to perform: determining a change in the phase relationship between the host device clock signal and the endpoint device clock signal; responsive to determining that the change in the phase relationship exceeds a threshold: generating a command including information about the change in the phase relationship; and transmitting, using the wireless transceiver, the command to the peripheral device to enable the peripheral device to update the at least one of the third time of acquiring next sensor data or the fourth time of monitoring for a next poll request from the peripheral device.

In some aspects, the command further includes accuracy information of the host device clock signal and indicates when to update the at least one of the third time of acquiring next sensor data or the fourth time of monitoring for a next poll request from the peripheral device.

In some aspects, the hardware processor is further configured to perform: receiving, using the wireless transceiver and from the peripheral device, a request to establish a wireless channel; and transmitting, using the wireless transceiver, an acknowledgement to the peripheral device at a second time determined based on a third time when the first indication of the host device clock signal is received.

In some aspects, the hardware processor is further configured to perform: determining a second time to initiate acquisition of second sensor data from a second peripheral device, the second time also determined based on the phase relationship between the host device clock signal and the endpoint device clock signal; and initiating the acquisition of the second sensor data from the second peripheral device at the determined second time.

In some aspects, the first indication of the host device clock signal includes a an interrupt signal. In some aspects, the wired interconnect comprises one or more Universal Serial Bus (USB).

In some examples, an apparatus comprises a wireless transceiver, a sensor, a memory device that stores a set of instructions, and a hardware processor configured to execute the set of instructions to perform: receiving, using the wireless transceiver and from an endpoint device coupled with a computer, a sensor data request at a first time; determining, based on the first time, a second time to receive a next sensor data request; determining a delay associated with acquiring sensor data from a sensor; determining, based on the delay and the second time, a third time to initiate the acquisition of the sensor data from the sensor; acquiring the sensor data from the sensor at the third time; and transmitting, using the wireless transceiver, the sensor data to the endpoint device as input data to the computer.

In some aspects, the endpoint device is coupled with a host device via a wired interconnect. The first time is determined based on a phase relationship between a host device clock signal provided to the host device and an endpoint device clock signal provided to the endpoint device.

In some aspects, the hardware processor is further configured to perform: receiving, from the endpoint device, a command including information about a change in the phase relationship; and determining the third time to initiate acquisition of sensor data from the sensor based on the command.

In some aspects, the command further includes accuracy information of the host device clock signal. The third time to initiate acquisition of sensor data is determined based on the accuracy information.

In some aspects, the first time is determined based on when the endpoint device is to receive a read request from a host device for the sensor data.

In some examples, an apparatus comprises a dongle coupled with a host device of a computer via a wired interconnect, and a peripheral device. The dongle is configured to perform: receiving, from the host device, a first indication of a host device clock signal; determining, based on the first indication and a second indication of an endpoint clock signal, a phase relationship between the host device clock signal and the endpoint clock signal; determining, based at least on the phase relationship, a first time for transmitting a sensor data request to a peripheral device of a computer; and transmitting the sensor data request wirelessly to the peripheral device at the first time. The peripheral device is configured to perform: acquiring sensor data at a second time determined based on a delay associated with the acquisition of the sensor data and when the sensor data request is to arrive from the dongle; receiving, wirelessly from the dongle, the sensor data request; and transmitting, wirelessly and in response to the sensor data request, the requested sensor data. The dongle is further configured to perform: receiving, from the peripheral device wirelessly, the requested sensor data; and providing the requested sensor data to the host device via the wired interconnect as input data to the computer.

In some examples, the dongle is configured to transmit a poll request to the peripheral device, receive a poll response including the sensor data from the peripheral device, and process the poll response to extract the sensor data.

In some examples, the dongle is further configured to perform: determining a change in the phase relationship between the host device clock signal and the endpoint device clock signal; responsive to determining that the change in the phase relationship exceeds a threshold: generating a command including information about the change in the phase; and transmitting, to the peripheral device, the command to enable the peripheral device to update the at least one of a third time of acquiring next sensor data or a fourth time of monitoring for a next poll request from the peripheral device.

In some examples, a method comprises: receiving, by an endpoint device from a host device, a first indication of a host device clock signal, the endpoint device and the host device being coupled via a wired interconnect; determining, by the endpoint device and based on the first indication and a second indication of an endpoint device clock signal, a phase relationship between the host device clock signal and the endpoint clock signal; determining, by the endpoint device and based at least on the phase relationship, a first time for transmitting a sensor data request to a peripheral device of a computer; transmitting, by the endpoint device and over a wireless channel, the sensor data request to the peripheral device at the first time; receiving, by the endpoint device and from the peripheral device, the requested sensor data; and providing, by the endpoint device, the requested sensor data to the host device via the wired interconnect as input data to the computer.

In some examples, a method of operating a plurality of peripheral devices of a computer comprises: establishing, using a first transceiver of a first endpoint device, a first wireless channel with a first peripheral device, the first endpoint device being coupled with a host device via a first interconnect; establishing, using a second transceiver of a second endpoint device, a second wireless channel with a second peripheral device, the second endpoint device being coupled with the host device via a second interconnect; receiving, by the first endpoint device using the first transceiver, first sensor data over the first wireless channel; receiving, by the second endpoint device using the second transceiver, second sensor data over the second wireless channel; providing, by the first endpoint device to the host device via the first interconnect, the first sensor data and the second sensor data; and providing, by the second endpoint device to the host device via the second interconnect, the first sensor data and the second sensor data.

In some aspects, the first endpoint device and the second endpoint device are the same endpoint device. The first interconnect and the second interconnect are the same interconnect.

In some aspects, the first transceiver is operated to establish the first wireless channel using a first wireless protocol. The second transceiver is operated to establish the second wireless channel using a second wireless protocol.

In some aspects, the first wireless protocol and the second wireless protocol are the same wireless protocol.

In some aspects, the first sensor data and the second sensor data are received from the endpoint device within a transmission period. The first wireless channel and the second wireless channel are configured such that the first sensor data is received using a different wireless carrier frequency from the second sensor data at any time within the transmission period.

In some aspects, the first sensor data is received using a first wireless carrier, a frequency of the first wireless carrier being modified based on a first wireless frequency hopping scheme within the transmission period. The second sensor data is received using a second wireless carrier, a frequency of the second wireless carrier being modified based on a second wireless frequency hopping scheme within the transmission period.

In some aspects, the first sensor data is transmitted using a first wireless carrier having a fixed first frequency within the transmission period. The second sensor data is transmitted using a second wireless carrier having a fixed second frequency within the transmission period.

In some aspects, the first sensor data and the second sensor data are received from the endpoint device within different transmission periods. The first sensor data and the second sensor data can be received using an identical wireless carrier frequency.

In some aspects, the method further comprises: transmitting, by the first endpoint device to the second endpoint device, information about the first wireless channel; and determining, at the second endpoint device and based on the information about the first wireless channel, the second wireless channel.

In some aspects, the information about the first wireless channel indicate a first frequency hopping sequence to be implemented at the first wireless transceiver. The second wireless channel is established based on a second frequency hopping sequence determined based on the information.

In some aspects, the information is transmitted by the first endpoint device to the second endpoint device when the first endpoint device starts up.

In some aspects, the information is transmitted by the first endpoint device to the second endpoint device after the first endpoint device receives the first sensor data over the first wireless channel.

BRIEF DESCRIPTION OF THE DRAWINGS

The detailed description is set forth with reference to the accompanying figures.

DETAILED DESCRIPTION

Figure 1:
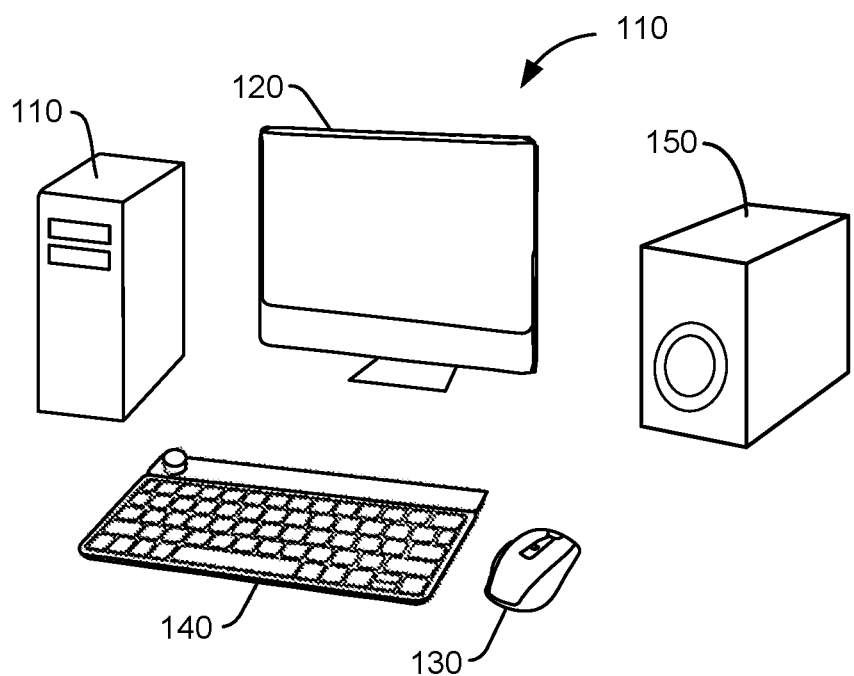
FIG. 1 shows a typical implementation for a system utilizing the disclosed techniques.

Aspects of the present disclosure relate generally to peripheral devices, and in particular to a wireless peripheral device controller, according to certain examples.

In the following description, various examples of a wireless peripheral device controller will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Despite the improvement brought about by wireless technology, bottlenecks exist that can add latency to the transmission of data from the peripheral devices to the computer, which can degrade user experience. For example, there is lack of synchronization between the wireless data transfer over the wireless connection and the data transfer over the wired interconnect. As a result, the data transfer delay between the wireless peripheral device and the computer processor may increase. New developments are needed to improve the synchronization between the wireless data transfer and the data transfer over the wired interconnect to reduce data transfer delay between the wireless peripheral device and the computer processor, which can facilitate a user's operations of the peripheral device and improve user experience.

Conceptual Overview of Certain Embodiments

Examples of the present disclosure relate to a wireless peripheral device controller. The wireless peripheral device controller can provide an interface between the host device and the one or more wireless peripheral devices. The wireless peripheral device controller can be connected with the host device via a wired interconnect and with the one or more wireless peripheral devices via one or more wireless channels. The wireless peripheral device controller can receive sensor data (e.g., sensing of X/Y movement of a computer mouse, sensing of pressing of a key of a keyboard, audio signals from a microphone, etc.) from the one or more wireless peripheral devices via the one or more wireless channels, and transmit the received sensor data to the host device via the wired interconnect. The wireless peripheral device controller can synchronize the wireless data transmissions of one or more wireless peripheral devices with the transmission of sensor data to a host device.

A wireless peripheral device controller according to the disclosed techniques can improve the synchronization between the wireless data transfer and the data transfer over the wired interconnect. The improved synchronization can reduce data transfer delay between the wireless peripheral device and the computer processor. For example, with the disclosed techniques, a latency between when a user moves or actuates a peripheral device button and when a corresponding action results on a computer (which receives the user's action information from the peripheral device wirelessly) can be reduced. This is especially valuable for improving the user experiences for applications that require sharp interactions between the user (e.g., gaming, instrument control, etc.) and the system including, for example, gaming, flight simulator, etc.

More specifically, the wireless peripheral device controller may receive indications of a continuously toggling host device clock signal that controls the timing of when the host device requests for data from the wireless peripheral device controller. The indications may be in the form of interrupts, with each interrupt corresponding to an edge (e.g., a rising edge) of the host device clock. In some examples, the interrupt can include, for example, a start of frame (SOF) interrupt. Based on the timing of the indication for a current host device clock cycle, the wireless peripheral device controller can determine when the next host device data request is expected to arrive. The wireless peripheral device controller may also synchronize the acquisition of sensor data from the wireless peripheral device with the host device clock by, for example, initiating the acquisition at a time point determined based on the timing of receiving the host device clock indication, to ensure that the sensor data is available when the next host device data request arrives. In some example, the wireless peripheral device controller may initiate the acquisition of sensor data by transmitting a request (e.g., a poll request) to the wireless peripheral device, or simply monitoring for the sensor data, at the determined time point.

There are various ways by which the wireless peripheral device controller can determine the time point to initiate acquisition of sensor data. In one example, the wireless peripheral device controller can initiate acquisition of sensor data after a pre-determined duration of time has elapsed from the time when the latest host device clock indication is received. The pre-determined duration can be determined based on a processing delay at the wireless peripheral device controller, and based on when the next host device data request is expected to arrive. The processing delay can be a delay at the wireless peripheral device controller to acquire and process the sensor data, such that the sensor data is available at the wireless peripheral device controller before the next host device data request arrives.

As another example, the wireless peripheral device controller can adopt a time-division multiple access (TDMA) scheme to initiate acquisition of sensor data from a plurality of wireless peripheral devices at different times within a host device clock cycle. The TDMA scheme can be adopted to minimize signal interference and collision among the wireless peripheral devices. Each of the different acquisition times can be determined with respect to the time of receiving the host device clock indication. The delay between each sensor data acquisition time and the time of receiving the host device clock indication can also be determined based on, for example, a delay incurred at a wireless peripheral device to acquire and process the sensor data and to transmit the sensor data wirelessly to the wireless peripheral device controller. The acquisition time from the last wireless peripheral device with the host device clock cycle, however, may still be determined based on the processing delay at the wireless peripheral device controller, such that all of the sensor data acquired from the plurality of wireless peripheral devices within the host device clock cycle become available at the wireless peripheral device controller before the next host device data request arrives.

In some examples, the wireless peripheral device controller may also transmit information about the timing of the host device clock signals to the wireless peripheral device, to enable the wireless peripheral device to determine when the wireless peripheral device controller will initiate the acquisition of next set of sensor data. The wireless peripheral device can determine when to collect the sensor data from its local sensor based on the information, to provide the most to-up-date sensor data when the wireless peripheral device controller initiates the acquisition of next set of sensor data.

There are various ways by which the wireless peripheral device controller transmits information about the timing of the host device clock signals to the wireless peripheral device. For example, when the wireless peripheral device controller receives a request from the wireless peripheral device, the wireless peripheral device controller can synchronize the acknowledgment with the host device clock indication. The wireless peripheral device controller may, for example, transmit the acknowledgement to the wireless peripheral device after a pre-determined duration of time has elapsed from the time when the host device clock indication is received. The reception of the acknowledgment at the wireless peripheral device can set as phase of the system clock at the wireless peripheral device, which enables the wireless peripheral device to synchronize its operation with the host device clock. In the case of TDMA, The wireless peripheral device controller may acknowledge each wireless peripheral device's connection request at different times, with each acknowledgment time being set with respect to the time when the host device clock indication is received (hence synchronized with the host device clock), to enable the operations at each wireless peripheral device to be synchronized with the host device clock.

In some examples, the wireless peripheral device controller may also detect a drifting in a current host device clock cycle and measure the amount of drifting. The drifting of the host device clock may lead to change in the expected arrival time of the next host data request. While the wireless peripheral device controller can adjust its time of acquisition of next set of sensor data based on the latest host device clock indication, as described above, the wireless peripheral device controller can transmit a command including the amount of drifting to the wireless peripheral device, to enable the wireless peripheral device to update an estimate of when to provide the sensor data to the wireless peripheral device controller. Based on the updated estimate, the wireless peripheral device can adjust its timing of operations including the timing of collecting the sensor data from its local sensor. In some examples, the wireless peripheral device controller may also transmit other information such as jitter measurement of the host device clock, to enable the wireless peripheral device to further refine the estimation of when to provide the sensor data to the wireless peripheral device controller.

There are various ways by which the wireless peripheral device controller can detect a drifting in a current host device clock cycle and measure the amount of drifting. For example, the wireless peripheral device controller may receive or generate an internal reference clock having the same nominal cycle period as the host device clock (e.g., based on an average cycle period of the host device clock, based on a designed cycle period of the host device clock absent drifting, etc.). The wireless peripheral device controller may determine a phase delay between host device clock and the internal reference clock (e.g., by measuring a delay between each host device clock and a corresponding clock edge of the internal reference clock). The wireless peripheral device controller may keep a record of the historical phase delays, and determine an amount of drifting by comparing a current phase delay (measured in a current host device clock cycle) against the historical phase delays. In some examples, to account for random drifting due to jitters, the wireless peripheral device controller may compare the amount of drifting against a threshold, and can take corrective actions (e.g., adjusting its timing of acquisition of the next sensor data, transmitting a command to the wireless peripheral device to adjust its timing of operation, etc.) if the amount of drifting exceeds the threshold.

By synchronizing the wireless data transfer (between the wireless peripheral device controller and the wireless peripheral device) with the host device clock, the data transfer delay between the wireless peripheral device and the computer processor can be reduced. For example, the wireless peripheral device can collect sensor data just in time to be acquired by the wireless peripheral device controller, whereas the wireless peripheral device controller can acquire the sensor data from the wireless peripheral device just in time before the next host device data request arrives. Such arrangement can minimize the total data transfer delay from the wireless peripheral device to the host device (and to the computer processor), which enables the computer processor to respond to an input of the user (detected via the peripheral device) more quickly, which can improve user experience as well as the system performance.

In some examples, to facilitate communication with multiple wireless peripheral devices, the wireless peripheral device controller may include multiple wireless transceivers (and antennae). Each of the multiple wireless transceivers can be assigned to communicate with a specific wireless peripheral device (or a specific group of wireless peripheral devices). As an illustrative example, in a case where the wireless peripheral device controller includes two wireless transceivers, one wireless transceiver can be assigned to communicate with a computer mouse, whereas the other wireless transceiver can be assigned to communicate with a keyboard and with a microphone. The wireless peripheral device controller can acquire sensor data from both of the wireless transceivers and transmit the sensor data to the host device via the interconnect.

The wireless peripheral device controller can also coordinate the acquisition of sensor data between the wireless transceivers to mitigate signal collisions and interferences. In some examples, the wireless transceivers can be assigned different frequency channels at different times (e.g., by providing them with different sequences of frequency hopping patterns) to perform wireless data transfer with the respective wireless peripheral devices. In some examples, the wireless transceivers can be operated according to a TDMA scheme where each wireless transceiver takes turn to acquire sensor data from the respective wireless peripheral device(s). In an example TDMA scheme, each wireless transceiver can be assigned a time slot to acquire sensor data from the respective wireless peripheral devices, and only one wireless transceiver can be turned on to acquire sensor data at an assigned time slot while other wireless transceivers can be turned off during that assigned time slot. The timing of acquisition of sensor data at each wireless transceiver can also be synchronized with the host device clock. With such arrangements, the computer processor can obtain valid sensor data from multiple peripheral devices in an efficient manner, which can further improve user experience as well as the system performance.

Typical System Environment for Certain Embodiments

FIG. 1 shows a typical implementation for a system 100 that can utilize the disclosed techniques. System 100 may include computer 110, display 120, and a plurality of peripheral devices including, for example, peripheral device 130 (e.g., "computer mouse 130"), peripheral device 140 (e.g., "keyboard 140"), and peripheral device 150 (e.g., "microphone 150"). For system 100, computer mouse 130, keyboard 140, and microphone 150 can be configured to control aspects of computer 110 and display 120, as would be understood by one of ordinary skill in the art. Computer 110 can be referred to as a "host computer" or a "host computing device." Each of peripheral devices 130-150 can include one or more sensors to sense an input action (or input signals, such as audio signals) provided by a user and generate corresponding sensor data (e.g., sensor data representing a distance of movement of computer mouse 130, sensor data indicating pressing of a key of keyboard 140, audio data collected by microphone 150, etc.). Peripheral devices 130-150 can provide the sensor data to computer 110 to control one or more operations of computer 110. For example, based on a movement detected by computer mouse 130, computer 110 can detect a selection of an audio file by the user in a graphical user interface displayed on display 120 and play the selected audio file.

Computer 110 may include a machine readable medium (not shown) that is configured to store computer code, such as keyboard driver software, and the like, where the computer code is executable by a processor (e.g., processor(s) 302) of computer 110 to affect control of computer 110 by peripheral devices 130, 140, and/or 150. The various examples described herein generally refer to peripheral device 130 as a computer mouse, peripheral device 140 as a keyboard, and peripheral device 150 as a microphone, however it should be understood that peripheral devices 130-150 can be any input/output (I/O) device, user interface device, control device, input unit, or the like. For example, peripheral devices 130-150 can also be a remote control device, a wearable device (e.g., smart watch, wristband, glasses), a smart phone, or the like.

The host computing device is typically described as a desktop or laptop computing device. However, it should be understood that the host computing device can be any suitable computing device further including a tablet computer, a smart phone, a virtual or augmented reality interface (e.g., having 2D or 3D displays), a holographic interface, or the like. One of ordinary skill in the art would understand the many variations, modifications, and alternative embodiments thereof.

Figure 2:
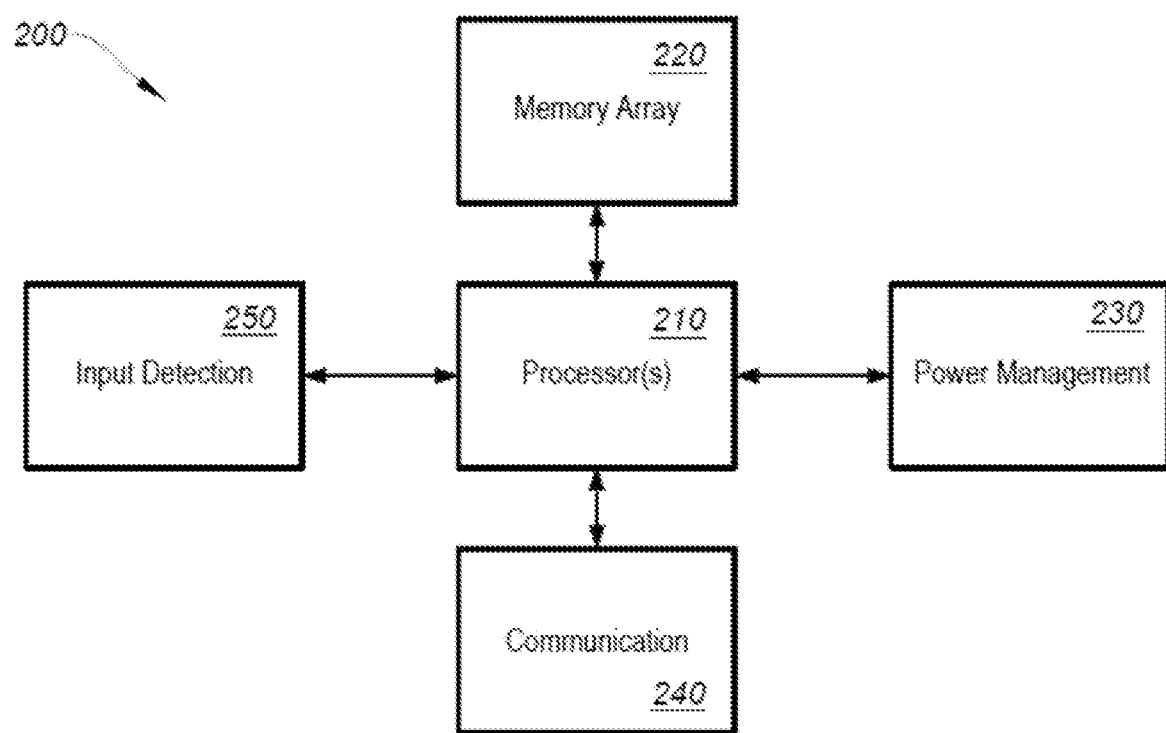
FIG. 2 shows a system for operating an peripheral device, according to certain examples of the present disclosure.

FIG. 2 shows a system for operating an peripheral device (e.g., one or more of peripheral devices 130-150), according to certain embodiments. System 200 includes processor(s) 210, memory array 220, power management system 230, communication system 240, and input detection module 250. Each of the system blocks 220-250 can be in electrical communication with the processor(s) 210 (e.g., via a bus system). System 200 may further include additional systems that are not shown or discussed to prevent obfuscation of the novel features described herein. System blocks 220-250 may be implemented as separate modules, or alternatively, more than one system block may be implemented in a single module.

In certain embodiments, processor(s) 210 comprises one or more microprocessors (μCs) and can be configured to control the operation of system 200. Alternatively, processor(s) 210 may include one or more microcontrollers (MCUs), digital signal processors (DSPs), or the like, with supporting hardware and/or firmware (e.g., memory, programmable I/Os, etc.), as would be appreciated by one of ordinary skill in the art. Processor(s) 210 can control some or all aspects of operation of peripheral devices 130-150 (e.g., system block 220-250). Alternatively or additionally, some of system blocks 220-250 may include an additional dedicated processor, which may work in conjunction with processor 210. One of ordinary skill in the art would understand the many variations, modifications, and alternative embodiments thereof.

Memory array 220 may be configured to store information pertaining to one or more operational configurations of peripheral devices 130-150. As further discussed below, one or more operational configurations of peripheral devices 130-150 may include setting performance characteristics of peripheral devices 130-150, including but not limited to, a computer mouse scroll speed, a sensitivity of computer mouse movement sensor, mapping of keyboard hot keys, microphone volume, etc., and the like. Memory array 220 may also store other configuration information used for communication with peripheral devices 130-150, as further discussed below.

Additionally, memory array 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution.

Power management system 230 can be configured to manage power distribution, recharging, power efficiency, and the like, for peripheral devices 130-150. In some embodiments, power management system 230 can include a battery (not shown), a USB based recharging system for the battery (not shown), and power management devices (e.g., low-dropout voltage regulators—not shown). In certain embodiments, the functions provided by power management system 230 may be incorporated into processor(s) 210. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use a USB connection to recharge the battery.

Communications system 240 can be configured to provide wireless and/or wired communication between processors 210 and one or more of peripheral devices 130-150, according to some examples. Communications system 240 can be configured to provide radio-frequency (RF), Bluetooth®, BLE, WiFi, infra-red (IR), ZigBee®, Logitech Unifying®, or other suitable communication technology to communicate with other computing devices and/or peripheral devices. Communications system 240 may also provide hardwired connection with processors 210. The hardwired connection can include a serial interconnect such as, for example, Universal Serial Bus (USB), FireWire®, DisplayPort®, etc.

One example of communication system 240 can be a dongle, which can provide a combination of wireless and wired communication between processors 210 and one or more of peripheral devices 130-150. For example, the dongle may include a wired connector interface (e.g., a USB connector) which can be plugged into a hardwire interface port (e.g., a USB port). The hardwire interface port, in turn, is connected to processors 210 via a hardwired interconnect (e.g., USB buses). Moreover, the dongle may also include a wireless interface (e.g., a Bluetooth® wireless interface) to perform wireless data transfer with peripheral devices 130-150. The dongle can receive sensor data from peripheral devices 130-150 via the wireless interface, and transmit the sensor data to processors 210 via the hardwired interconnect. As to be discussed in more details below, the present disclosure provide techniques to synchronize the wireless data transfer (via the wireless interface) with the wired data transfer (via the hardwired interconnect), which can reduce data transfer delay between peripheral devices 130-150 and processors 210.

Input detection module 250 can control the detection of a user-interaction with input elements on peripheral devices 130-150. For instance, input detection module 250 can detect user inputs based on sensor data from computer mouse 130. In some embodiments, input detection module 250 can work in conjunction with memory array 220 to generate input data to processors 210 based on the sensor data received from communication system 240. For example, based on scrolling speed information stored in memory array 220 as well as sensor data from computer mouse 130, input detection module 250 can calculate a distance traversed by a mouse pointer on display 120, and provide the distance information to processors 210 (or a renderer) to render the movement of the mouse on display 120.

Although certain systems may not expressly discussed, they should be considered as part of system 200, as would be understood by one of ordinary skill in the art. For example, system 200 may include a bus system to transfer power and/or data to and from the different systems therein.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices implemented using any combination of circuitry and software. Furthermore, aspects and/or portions of system 200 may be combined with or operated by other sub-systems as required by design. For example, input detection module 250 and/or memory array 220 may operate within processor(s) 210 instead of functioning as a separate entity. In addition, the inventive concepts described herein can also be applied to various peripheral devices and not limited to computer mice, keyboards, or microphones. System 200 can be applied to any of the peripheral devices described in the embodiments herein, whether explicitly, referentially, or tacitly described (e.g., would have been known to be applicable to a particular peripheral device by one of ordinary skill in the art). The foregoing embodiments are not intended to be limiting and those of ordinary skill in the art with the benefit of this disclosure would appreciate the myriad applications and possibilities.

Figure 3:
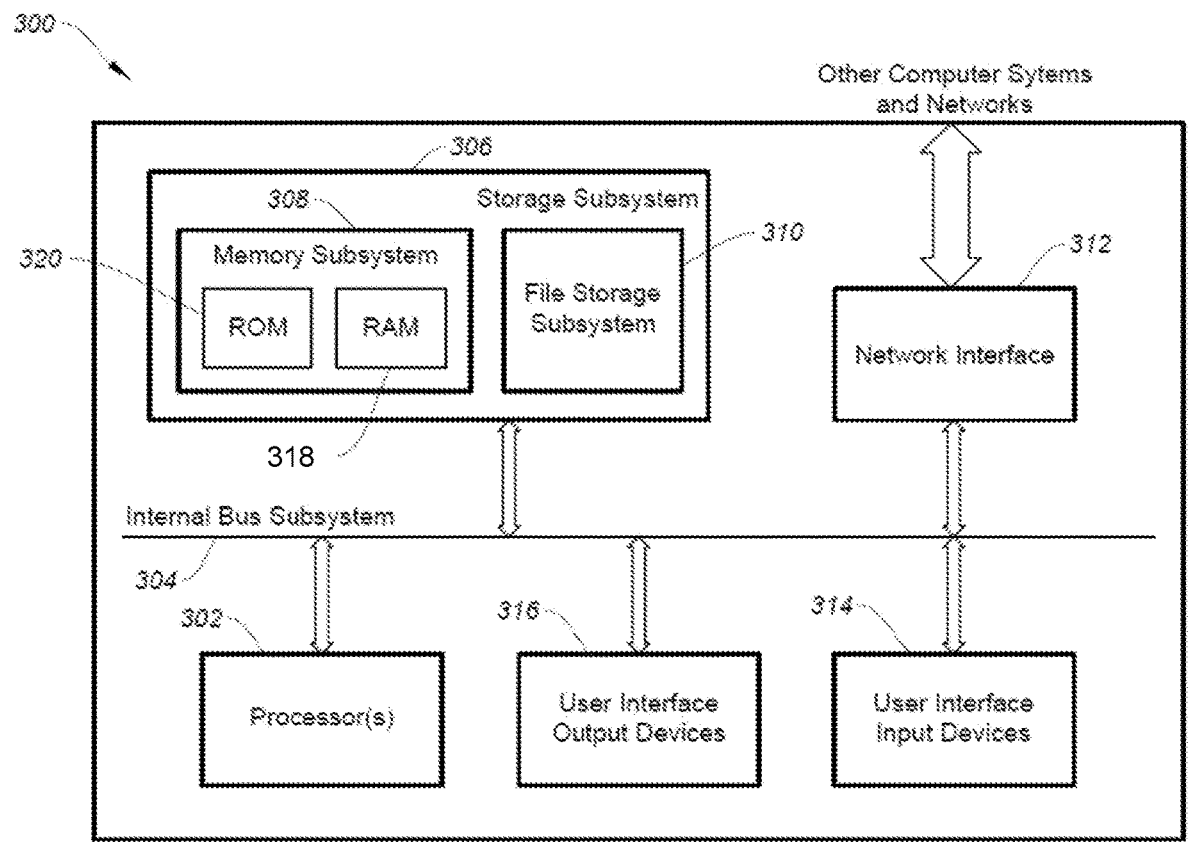
FIG. 3 shows a system for operating a host computing device, according to certain examples of the present disclosure.

FIG. 3 shows a system 300 for operating a host computing device (e.g., host computing device 110), according to certain embodiments. System 300 can be used to implement any of the host computing devices discussed herein with respect to FIG. 1, FIG. 2, and the myriad examples described herein or within the purview of this disclosure but not necessarily explicitly described. System 300 can include one or more processors 302 that can communicate with a number of peripheral devices (e.g., peripheral devices) via a bus subsystem 304. These peripheral devices can include storage subsystem 306 (comprising memory subsystem 308 and file storage subsystem 310), user interface peripheral devices 314, user interface output devices 316, and network interface subsystem 312. User peripheral devices 314 can be any of the peripheral device types described herein (e.g., keyboard, computer mouse, remote control, etc.). User output devices 316 can be a display of any type, including computer monitors, displays on handheld devices (e.g., smart phones, gaming systems), or the like, as would be understood by one of ordinary skill in the art. Alternatively or additionally, a display may include virtual reality (VR) displays, augmented reality displays, holographic displays, and the like, as would be understood by one of ordinary skill in the art.

In some examples, internal bus subsystem 304 can provide a mechanism for letting the various components and subsystems of computer system 300 communicate with each other as intended. Although internal bus subsystem 304 is shown schematically as a single bus, alternative embodiments of the bus subsystem can utilize multiple buses. One example of internal bus subsystem 304 includes USB buses. Additionally, network interface subsystem 312 can serve as an interface for communicating data between computer system 300 and other computer systems or networks. Embodiments of network interface subsystem 312 can include wired interfaces (e.g., Ethernet, CAN, RS232, RS485, etc.) or wireless interfaces (e.g., Bluetooth®, BLE, ZigBee®, Z-Wire®, Wi-Fi, cellular protocols, etc.). In some examples, network interface subsystem 312 may be part of a dongle, and the dongle can be connected to internal bus subsystem 304 (e.g., USB buses) to communicate with processor(s) 302 as described above.

In some cases, user interface peripheral devices 314 can include a keyboard (keyboard 140), a presenter, a pointing device (e.g., mouse, trackball, touchpad, etc.), a touchscreen incorporated into a display, audio peripheral devices (e.g., voice recognition systems, microphones, etc.), Human Machine Interfaces (HMI) and other types of peripheral devices. In general, use of the term "peripheral device" is intended to include all possible types of devices and mechanisms for inputting information into computer system 300. Additionally, user interface output devices 316 can include a display subsystem, a printer, or non-visual displays such as audio output devices, etc. The display subsystem can be any known type of display device. In general, use of the term "output device" is intended to include all possible types of devices and mechanisms for outputting information from computer system 300.

Storage subsystem 306 can include memory subsystem 308 and file storage subsystem 310. Memory subsystems 308 and file storage subsystem 310 represent non-transitory computer-readable storage media that can store program code and/or data that provide the functionality of embodiments of the present disclosure. In some embodiments, memory subsystem 308 can include a number of memories including main random access memory (RAM) 318 for storage of instructions and data during program execution and read-only memory (ROM) 320 in which fixed instructions may be stored. File storage subsystem 310 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 300 is illustrative and not intended to limit embodiments of the present disclosure. Many other configurations having more or fewer components than system 300 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Examples of a Communication System

Figure 4:
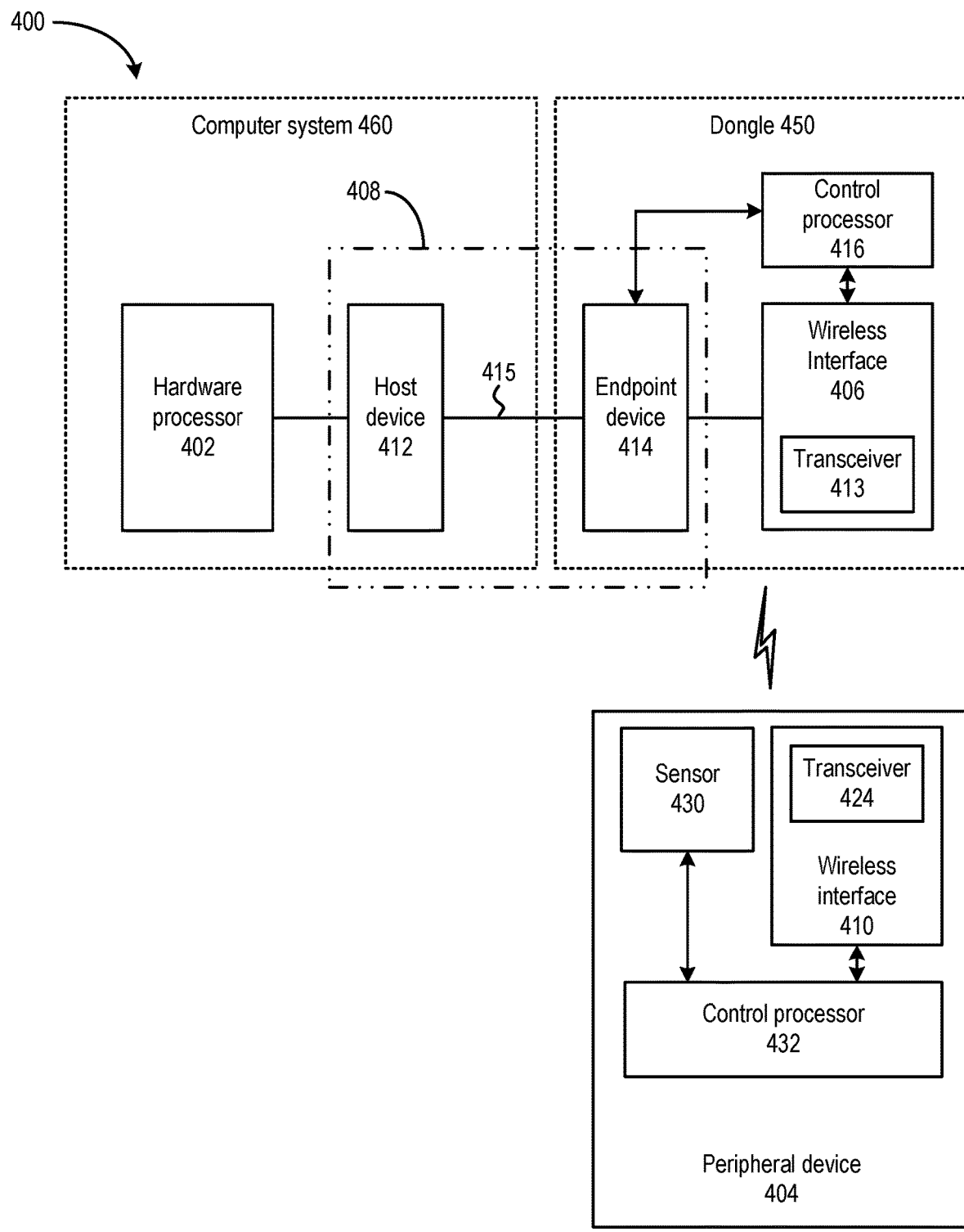
FIG. 4 shows a communication system between a host computing device and a peripheral device, according to certain examples of the present disclosure.

FIG. 4 shows an example of a communication system 400 for which the disclosed techniques can be applied. Communication system 400 can provide data transfer between a hardware processor 402 (e.g., processors 210 of FIG. 2, processors 302 of FIG. 3, etc.) and a peripheral device 404 (e.g., peripheral devices 130-150). Communication system 400 may include a wireless interface 406 and a wired interconnect 408 on the side of hardware processor 402 (e.g., as part of computer 110 and/or systems 200 and 300), and a wireless interface 410 on the side of peripheral device 404.

Wired interconnect 408 further comprises a host device 412, an endpoint device 414, and a bus 415 connected between host device 412 and endpoint device 414. Over wireless interfaces 406 and 410 and wired interconnect 408, data can be transferred between hardware processor 402 and peripheral device 404.

As shown in FIG. 4, wireless interface 406 and endpoint device 414 can be part of a dongle 450, whereas hardware processor 402 and host device 412 can be part of a computer system 460. Dongle 450 may further include a control processor 416 to control the operations of wireless interface 406 and endpoint device 414 including, for example, operations for data transfer between hardware processor 402 and peripheral devices 404. Although FIG. 4 shows that control processor 416 is a single entity, it is understood control processor 416 can include multiple entities and some of the entities can be part of wireless interface 410. Moreover, peripheral device 404 may also include a sensor 430 to detect an user's input and generate sensor data, and a control processor 432 to process the sensor data and to control wireless interface 410 to transmit the sensor data to dongle 450, which can then transmit the sensor data to hardware processor 402 via wired interconnect 408. A wireless network formed between dongle 450 and peripheral device 404 can be referred to as a piconet. A connection event between wireless interfaces 406 and 410 can occur when data packets are transferred between the interfaces. From a connection event, control processor 416 may obtain sensor data from peripheral device 404, and provide the sensor data to endpoint device 414. Endpoint device 414 can transmit the sensor data to host device 412 via bus 415.

Wireless interface 406 may include one or more wireless transceivers 413, whereas wireless interface 410 may also include a wireless transceiver 424. Each of wireless transceivers 413 and 424 can be controlled by, respectively, control processors 416 and 432, to transmit and receive radio signals to perform wireless data transfer. Wireless transceivers 413 and 424 may include, for example, antennae, power amplifiers, low noise amplifiers, mixers, analog-to-digital converters (ADC), etc., and can perform data transfer based on pre-determined protocols including, for example, Bluetooth®, BLE, etc. For example, under Bluetooth® and BLE protocols, the wireless carrier frequency for data transmission/reception can be changed based on a pre-determined frequency hopping sequence, and various components (e.g., mixers) of wireless transceivers 413 and 424 can be operated based on the pre-determined frequency hopping sequence to perform the data transfer for a connection event.

In some examples, over a wireless piconet formed between dongle 450 and peripheral device 404, dongle 450 can act as a master device, whereas peripheral device 404 can act as a slave device. Control processor 416 can initiate acquisition of sensor data, via wireless interface 406, by transmitting a request (e.g., a poll request) to wireless interface 410 at pre-determined time intervals, and the peripheral wireless communication device can listen for the poll request and provide sensor data in response to the poll request. In some examples, control processor 416 can also schedule when peripheral devices 404 are to transmit sensor data, and can transmit schedule information to peripheral devices 404. Based on the schedule information, peripheral devices 404 can transmit sensor data at the scheduled times, whereas wireless interface 406 can initiate acquisition of sensor data by listening for the sensor data from peripheral devices 404 also at the scheduled times. In both cases, application processor 422 (of peripheral devices 404) may determine when the next connection event is to occur (e.g., based on previous sensor data transmissions to wireless interface 406, previous poll requests received from wireless interface 406, etc.), and can acquire sensor data from sensor 430 in advance of the next connection event.

Communication system 400 also includes wired interconnect 408 which is connected with wireless interface 406. Sensor data received over wireless interface 406 can be transmitted to hardware processor 402 via wired interconnect 408. Host device 412 may transmit a read request for data over bus 415. Upon receiving the read request, host device 412 can transmit the sensor data to host device 412 over bus 415. In some examples, bus 415 can be a USB bus, and dongle 450 can be configured as a USB dongle having a hardware connector (e.g., a USB connector) that can be plugged into a hardware port (e.g., a USB port) of computer system 460 to form a connection. The hardware port can be hardwired to USB bus 415 of computer system 460.

Although FIG. 4 illustrates that endpoint device 414 is separate from computer system 460, it is understood that endpoint device 414 may also be an internal module of computer system 460, and that endpoint device 414 is not connected to host device 412 via a hardware port (e.g., a USB port). For example, host device 412 and endpoint device 414 can be connected via, for example, and Inter-Integrated Circuit (I2C) bus on a motherboard. Similarly, wireless interface 406 and control processor 416 can also be part of computer system 460.

Each of host device 412, dongle 450, and peripheral device 404 can be a synchronous system. Each of these systems may include a local internal clock and set of digital sequential circuits configured as a finite state machine (FSM) clocked by the local internal clock, which can set the state transitions and outputs of the FSM and control the timings of operations of each respective system. The local internal clock can be a continuously toggling signal with a nominal frequency (notwithstanding drift, jitter, etc.) configured to control the timing of operations of various digital sequential circuits. For example, peripheral device 404 may include a local internal clock to control the timing of when to collect sensor data from sensor 430, when to listen for a poll request from wireless interface 406, when to transmit the acquired data to interface 406 in response to the poll request, etc. Dongle 450 may also include a local internal clock to control the timing of when to transmit a poll request to peripheral devices 404 for sensor data, and when to process and store the sensor data, etc. Host device 412 may also include a local internal clock to control the timing of when to transmit a read request for data to endpoint device 414 of dongle 450.

Figure 5:
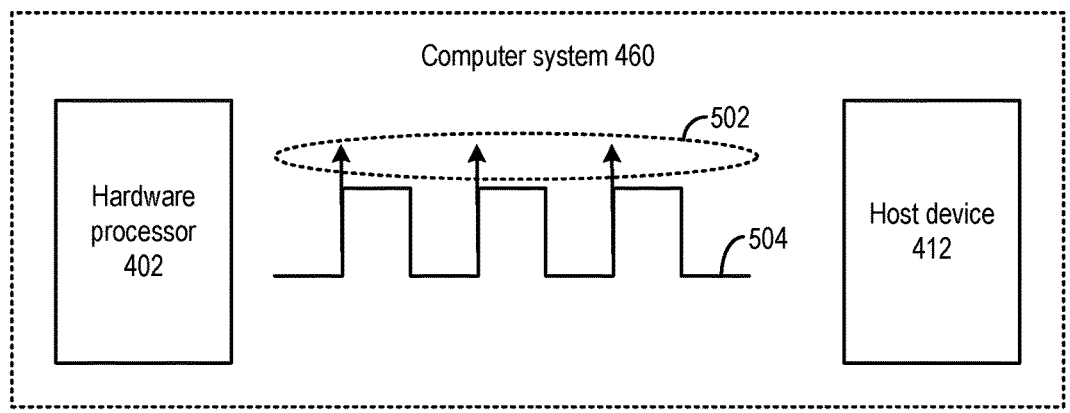
FIG. 5 shows the generations of local internal clocks for the communication system of FIG. 4, according to certain examples of the present disclosure.
Figure 5:
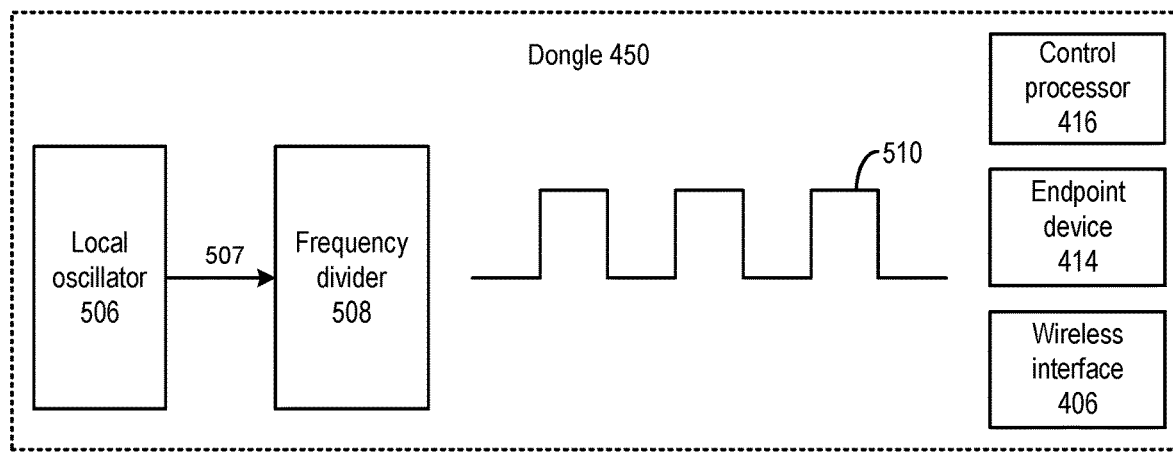
Figure 5:
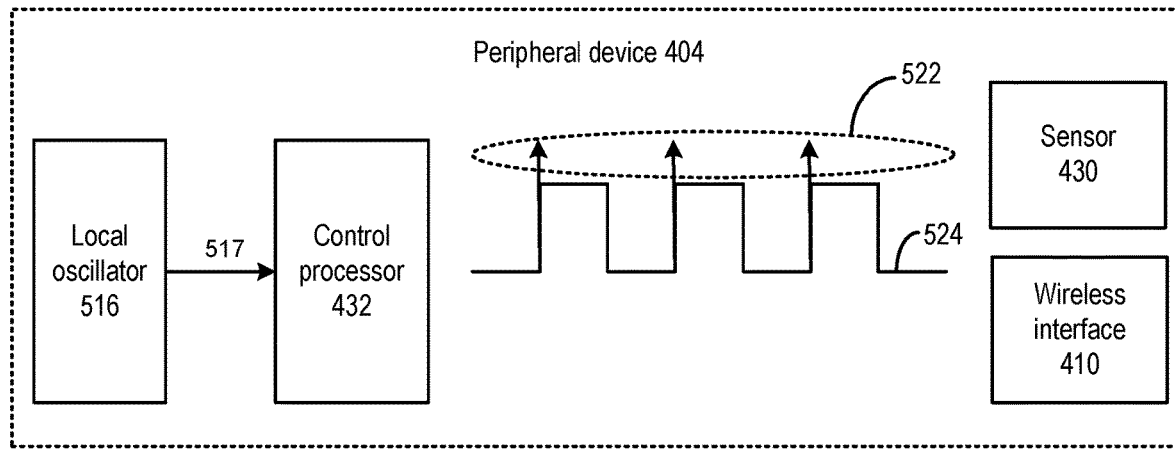

Each of host device 412, dongle 450, and peripheral device 404 can receive or generate a local internal clock from a clock source. FIG. 5 illustrates examples of the generations of local internal clocks for host device 412, dongle 450, and peripheral device 404. In the example of FIG. 5, within computer system 460, host device 412 may receive a set of nominally periodic interrupt signals 502 (e.g., Start of Frame (SOF) interrupts in USB). Interrupt signals 502 can be provided by, for example, hardware processor 402, and can be configured as host device clock 504. An SOF interrupt can trigger host device 412 to transmit a read request to endpoint device 414 over bus 415. Moreover, dongle 450 may include a local oscillator 506, which can output an oscillator signal 507 with a relatively high frequency. Oscillator signal 507 can be processed by a frequency divider 508, which can perform frequency division on oscillator signal 507 to generate a dongle clock 510 with a lower frequency than oscillator signal 507. Dongle reference clock 510 can be used to set the timings of operations at wireless interface 406, endpoint device 414, and control processor 416. Further, peripheral device 404 may also include a local oscillator 516, which can also output an oscillator signal 517 with a relatively high frequency. Oscillator signal 517 can be processed by control processor 432 to generate a set of nominally periodic interrupt signals 522 (e.g., radio notification interrupt signals 522), which can be configured as peripheral device clock 524 and can be used to set the timings of operations at wireless interface 410 and sensor 430. For example, wireless interface 410 can be controlled by control processor 432 to enter a receiver mode (e.g., an RX mode) to listen for a polling request from wireless interface 406 in response to a radio notification interrupt signal.

Need for Synchronization Between Wireless Data Transfer and Wired Data Transfer

Figure 6A:
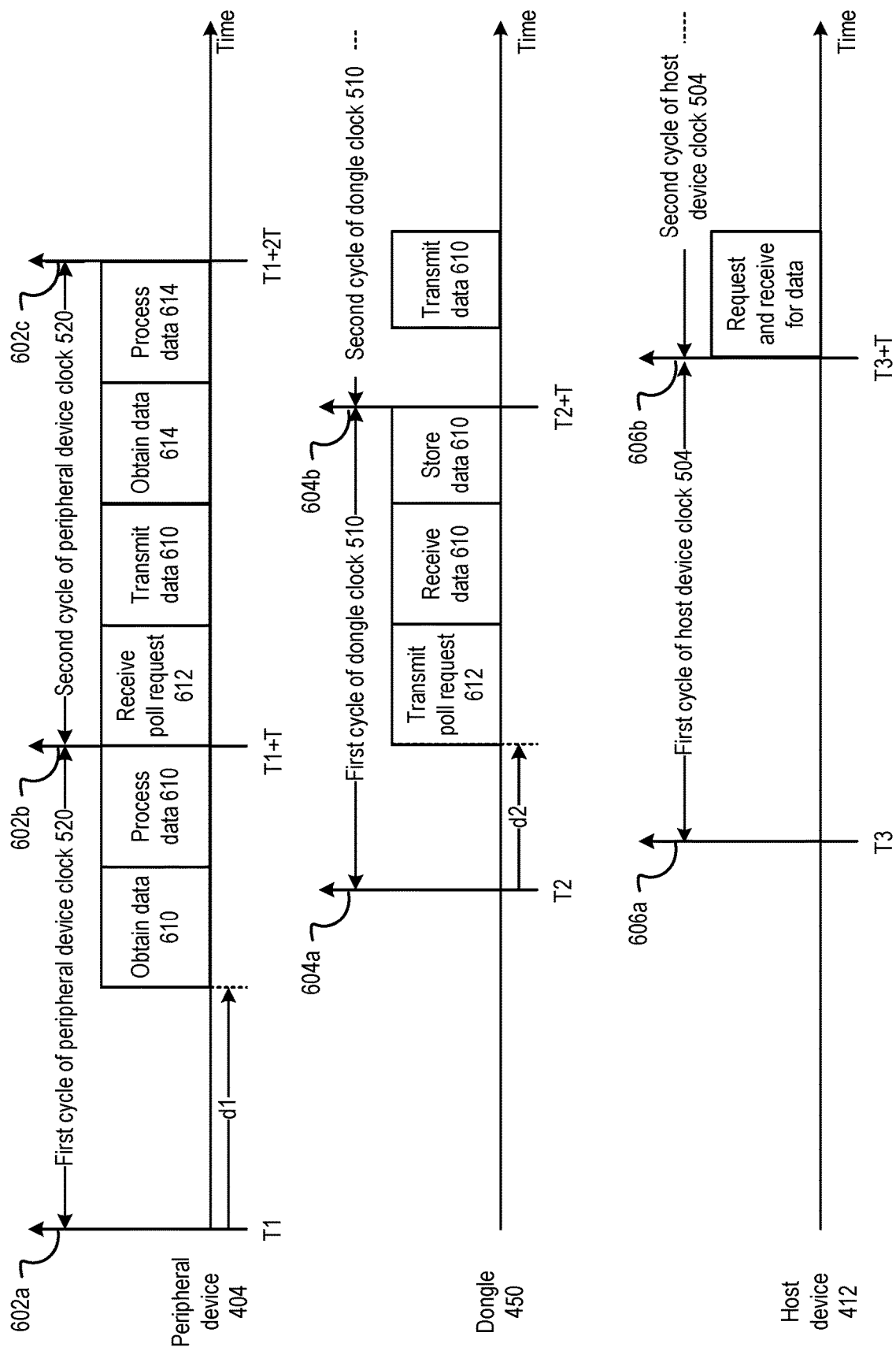
FIGS. 6A-6C shows examples of wireless and wired data transfer.

Typically, the clock periods of peripheral device clock 524, dongle reference clock 510, and host device clock 504 are configured to be identical, and one instance of data transfer may take place in each clock cycle. FIG. 6A illustrates an example of the timing for the data transfers between peripheral device 404 and host device 412 via endpoint device 414. In the example of FIG. 6A, the horizontal axes represent timelines. Each of peripheral device clock 520, dongle clock 510, and host device clock 504 has the same period T. At peripheral device 404, a first cycle of peripheral device clock 520 can be defined by clock edges 602a and 602b, which arrive at times T1 and T1+T respectively, whereas a second cycle of peripheral device clock 520 can be defined by clock edges 602b and 602c. Clock edge 602c arrives at time T1+2T. Each of clock edges 602a, 602b, and 602c may correspond to a radio notification interrupt. Moreover, at endpoint device 414, a first cycle of dongle clock 510 can be defined by clock edges 604a and 604b, which arrive at times T2 and T2+T respectively. A second cycle of dongle clock 510 starts at time T2+T. Further, at host device 412, a first cycle of host device clock 504 can be defined by clock edges 606a and 606b. A second cycle of host device clock 504 starts at time T3+T. Clock edges 606a and 606b may correspond to SOF interrupts.

At peripheral device 404, after a fixed delay d1 from time T1 (and within the first cycle of peripheral device clock 520), control processor 432 obtains a first set of sensor data (sensor data 610) from sensor 430, and processes sensor data 610 (e.g., generate data packets, etc.) to prepare for wireless transmission before clock edge 602b arrives. Also, at dongle 450, after a fixed delay d2 from time T2 (and within the first cycle of clock 510), control processor 416 can operate wireless interface 406 to initiate acquisition of sensor data from peripheral device 404 by, for example, transmitting a polling request 612. Peripheral device 404 can receive the polling request, and can transmit sensor data 610 to endpoint device 414. Back at dongle 450, control processor 416 receives data 610 and provide data 610 to endpoint device 414, which can process and store sensor data 610 at a local register before clock edge 606b arrives. At time T3+T (second cycle of host device clock 504), host device 412 may, responsive to receiving an SOF interrupt (represented by clock edge 602b), transmit a read request to endpoint device 414 (of dongle 450). Endpoint device 414 can receive the read request, and can provide sensor data 610 to host device 412 in response to the read request. Meanwhile, at peripheral device 404, control processor 432 can obtain a second set of sensor data (sensor data 614) from sensor 430 within the second cycle of peripheral device clock 520.

Sensor data 614 can be transmitted to dongle 450 at a subsequent cycle of peripheral device clock 520.

In the example of FIG. 6A, host device 412 can acquire the sensor data obtained by peripheral device 404 within about one cycle period of host device clock 504, which can represent a minimum delay. The reduction in the delay can be attributed to, for example, endpoint device 414 initiating acquisition of sensor data from peripheral device 404 after peripheral device 404 obtains sensor data in the latest cycle, and endpoint device 414 receiving the read request from host device 412 after endpoint device 414 receives the latest cycle sensor data from peripheral device 404. A reduced delay in data transfer between peripheral device 404 and host device 412 is highly desirable to enable computer system 460 more responsive in tracking a user's input. However, without a synchronization scheme to synchronize the operations of peripheral device 404, dongle 450 and host device 412, the timing relationship among when endpoint device 414 initiates acquisition of sensor data, when peripheral device 404 obtains sensor data, and when host device 412 transmits read requests may change. The timing relationship may change because of uncertainties in the timing of the clock signals including, for example, clock jitter, clock drift, etc. As a result, delay in data transfer between peripheral device 404 and host device 412 may increase, or host device 412 may skip/miss one or more instances of sensor data. All these can reduce the capability of computer system 460 in tracking the user's input and degrade user experience.

Figure 6B:
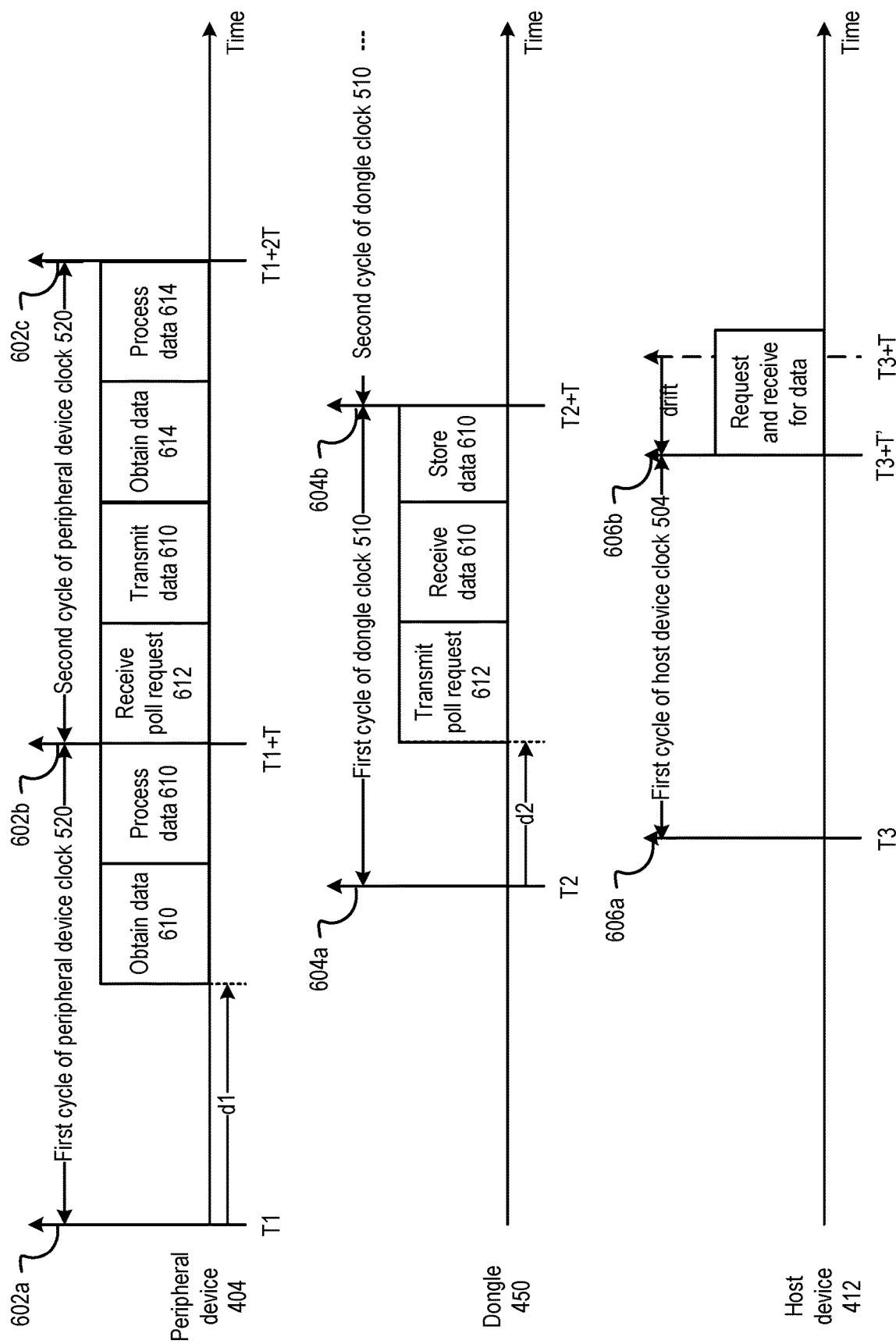
Figure 6C:
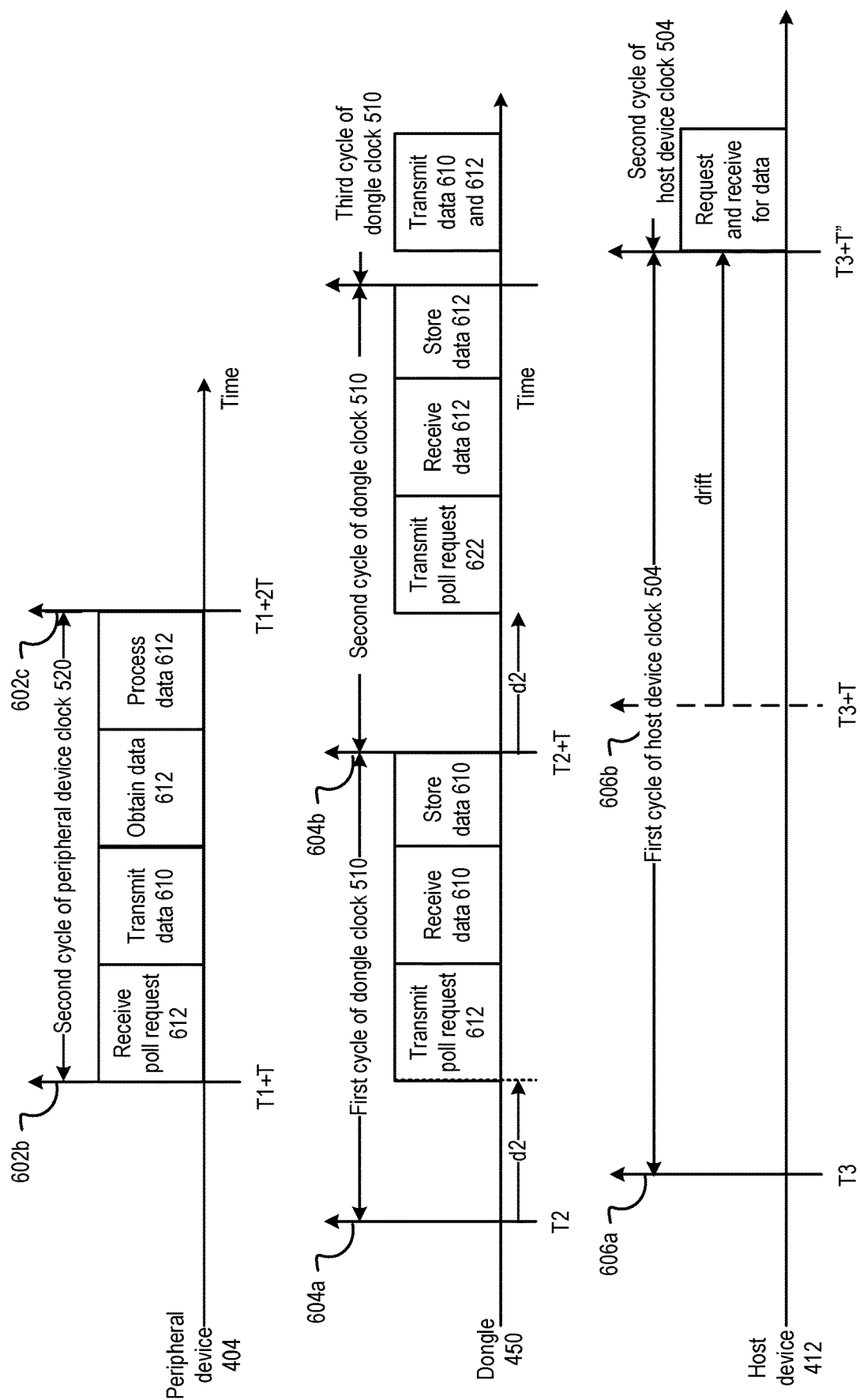

FIG. 6B and FIG. 6C illustrate examples of clock timing uncertainties that can increase the system response time or lead to skipping of sensor data. FIG. 6B illustrates an example of host device 412 skipping one or more instances of sensor data. In the example of FIG. 6B, an SOF interrupt (represented by clock edge 606b) may arrive at T3+T' which precedes T3+T. The early arrival of the SOF interrupt causes host device 412 to transmit a read request for sensor data at a time when dongle 450 is unable to process the read request. For example, at time T3+T', endpoint device 414 may be in the process of receiving data 610 from control processor 416 and cannot respond to the read request. Host device 412 may skip sensor data 610 as a result. If subsequent SOF interrupts (and host device read requests) continue to arrive at times when endpoint device 414 is unable to process read requests from host device 412, host device 412 may also skip other sensor data (e.g., sensor data 614) subsequently obtained by peripheral device 404.

FIG. 6C illustrates an example of system response time being increased. In the example of FIG. 6C, an SOF interrupt (represented by clock edge 606b) may arrive at T3+T", which is after T3+T. Endpoint device 414 does not receive a read request at time T3+T (and in a second cycle of dongle clock 510), and may transmit another poll request 622 to peripheral device 404 and obtain sensor data 614. Endpoint device 414 may also add sensor data 614 to the sensor data stored in the local register. When endpoint device 414 receives a read request at time T3+T", it can transmit both sensor data 610 and 614 to host device 412.

In both examples of FIG. 6B and FIG. 6C, hardware processor 402 may respond to the user's input captured by sensor data 610 late, or unable to respond to the input altogether, both of which are undesirable. For example, in the example of FIG. 6B, host device 412 skips/misses sensor data 610 and cannot provide sensor data 610 to hardware processor 402, causing the hardware processor to miss the user input captured by sensor data 610. In the example of FIG. 6C, although hardware processor 402 receives sensor data 610 (and sensor data 614), the delay between when sensor data 610 is obtained by peripheral device 404 and when sensor data 610 is received by hardware processor 402 increases compared with FIG. 6A. As a result, hardware processor 402 may respond to the user's input late. Both degrades the responsiveness of the computer system to the user's input.

Synchronization Between Wireless Data Transfer and Wired Data Transfer

Figure 7A:
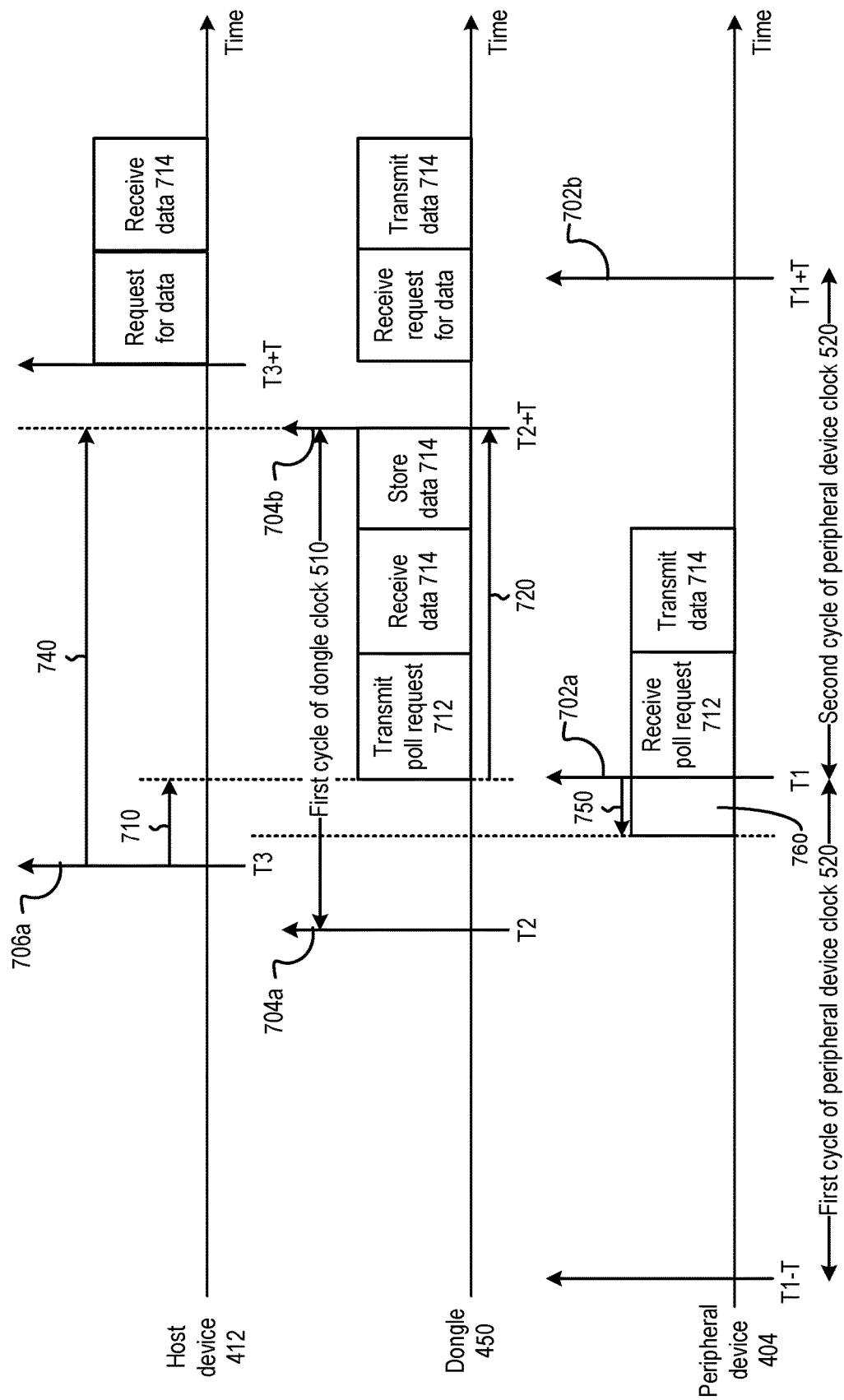
FIGS. 7A-7B shows synchronized wireless and wired data transfer using the communication system of FIG. 4, according to certain examples of the present disclosure.

FIG. 7A illustrates an example of synchronization between dongle 450 and host device 412. In the example of FIG. 7A, endpoint device 414 can synchronize the acquisition of sensor data from peripheral device 404 with both dongle clock 510 and with host device clock 504 (or SOF interrupts 502), such that sensor data can be acquired and made available to service a subsequent read request from host device 412 in a subsequent cycle of host device clock 504.

More specifically, control processor 416 may obtain information about host device clock 504 based on, for example, SOF interrupt signals 502, data packets (e.g., SOF packets), etc. that are received by endpoint device 414 from host device 412. Control processor 416 receives an indication from endpoint device 414 that an SOF interrupt signal or an SOF packet is received, and can derive the timing of clock edge 706a of host device clock 504 based on the indication. Assuming that control processor 416 determines that clock edge 706a arrives at time T3 within a first cycle of dongle clock 510 (which is defined by clock edges 704a and 704b at times T2 and T2+T), control processor 416 may synchronize transmission of certain signals to peripheral device 404 with respect to the time T3. For example, control processor 416 may operate endpoint device 414 to transmit a connection request acknowledgment (not shown in FIG. 7A) to peripheral device 404 to establish a wireless connection with the peripheral device. As another example, control processor 416 may initiate acquisition of sensor data by, for example, transmitting a polling request to peripheral device 404. Both the transmission of connection request acknowledgment and polling request can take place after a pre-determined delay 710 from clock edge 706a, such that the transmission of connection request acknowledgment and polling request are synchronized with clock edge 706a (and with host device clock 504).

In some examples, delay 710 can be determined based on, for example, a duration of a processing time 720 that covers the transmission of a polling request 712 to peripheral device 404, the reception of sensor data 714 from peripheral device 404, and the processing and storage of sensor data 714 at endpoint device 414. Delay 710 can also be determined based on when the next clock edge 704b of dongle clock 510 is expected to arrive. In the example of FIG. 7A, control processor 416 can determine a duration 740 elapsed between clock edge 706a of host device clock 504 and clock edge 704b of dongle clock 510, and obtain delay 710 based on the following equation:

Delay 710=Duration 740−Processing Time 720    (Equation 1)

With such arrangements, control processor 416 may adjust the timing of transmission of a polling request to account for change in the timing of host device clock 504, which enables the wired data transfer between endpoint device 414 and host device 412 to be synchronized with host device clock 504. For example, endpoint device 414 can transmit a polling request at a pre-determined time point, with the time point being determined such that sensor data can be acquired and processed before the next read request is received from host device 412, when clock edge 706b of host device clock 504 arrives at time T3+T. Moreover, by determining delay 710 also with reference to dongle clock 510 (based on determination of duration 740), the transmission of the polling request can also be synchronized with dongle clock 510 which sets the timing of other operations of dongle 450 (e.g., wireless interface 406), which can facilitate correct operations at dongle 450.

In addition, control processor 416 can also control peripheral device 404 to synchronize the collection of sensor data from sensor 430 with host device clock 504. Such arrangements enable peripheral device 404 to provide the latest sensor data when endpoint device 414 initiates the acquisition of sensor data, the timing of which is also synchronized with host device clock 504 as described above. In the example of FIG. 7A, control processor 416 can control peripheral device 404 to start process 760 of obtaining and processing sensor data from sensor 430 at a duration 750 before the expected reception of poll request 712 at time T1, which can correspond to clock edge 702a of peripheral device clock 524. Given that the transmission of poll request 712 is synchronized with host device clock 504 (e.g., being delayed by a duration of 710 from clock edge 706a of host device clock 504), the timing of process 760 at peripheral device 404 can also be synchronized with host device clock 504 as a result. In some examples, duration 750 can be determined based on, for example, the total time taken by peripheral device 404 to acquire sensor data from sensor 730 and prepare the sensor data for transmission (e.g., process delay, time for generating packets for wireless transmission, etc.).

There are different ways by which control processor 416 can control peripheral device 404 to synchronize the collection of sensor data from sensor 430 with clock edge 706a of host device clock 504. In some examples, based on a pre-determined configuration, control processor 432 of peripheral device 404 may synchronize the generation of radio notification interrupt signals 522 (which can be used to generate peripheral device clock 524) with the reception of different signals from endpoint device 414. For example, control processor 432 can set the timing of the generation of radio notification interrupts based on when the connection request acknowledgement and the poll requests are received from dongle 450. Control processor 432 may trigger the generation of radio notification interrupts upon receiving the acknowledgement message and the poll requests. Control processor 432 may also predict, based on the timing of when the prior poll requests were received, when dongle 450 is likely to transmit the next poll request. Peripheral device 404 can generate the next radio notification interrupt and listen for the next poll request at the predicted time. Moreover, within a cycle of peripheral device clock 504 (e.g., as defined by times T1−T and T1), control processor 432 may also start process 760 of obtaining and processing sensor data from sensor 430 at duration 750 before the time when the next radio notification interrupt is generated (e.g., at time T1).

In addition, control processor 416 (of dongle 450) may also transmit, as a standalone message to peripheral device 404 and over a wireless channel, timing information that indicates a timing adjustment value (e.g., a change in the duration of delay 710) to be applied to the transmission of a next poll request. The standalone message enables control processor 432 of peripheral device 404 to adjust the timing of when to obtain sensor data (e.g., by adjusting duration 750) and when to listen for next poll request (e.g., by adjusting when to generate the next radio notification interrupt) in advance of receiving the next poll request, which allows peripheral device 404 to respond to the timing changes of host device clock 504 more quickly. For example, referring to FIG. 7A, control processor 416 (of dongle 450) can determine whether the timing of clock edge 706a of host device clock 504 deviates from an expected timing. Control processor 416 can also determine a timing adjustment value to be applied to the transmission of a next poll request to account for the timing changes, and transmit the timing adjustment value right after time T3. Control processor 432 of peripheral device 404 can receive the timing adjustment value via the standalone message in a first cycle of peripheral device clock 520 (defined by times T1−T and T1), and can determine the time (T1) when the next poll request will arrive based on the timing adjustment value. Control processor 432 can also determine the start time of process 760 (to obtain and process sensor data from sensor 430) by subtracting duration 750 off time T1. At time T1, control processor 432 can control wireless interface 410 to enter RX mode to listen for poll request 712 and transmit data 714 to dongle 450.

There are different ways by which control processor 416 can detect and measure timing changes of host device clock 504. For example, control processor 416 may keep a record of timing of when the prior clock edges of host device clock 504 (or SOF interrupts 502) were received. The record can be stored at, for example, memory array 220 of FIG. 2. Based on the record, control processor 416 can determine a nominal or average period of host device clock 504, and can predicted when a future clock edge of host device clock 504 (or a future SOF interrupt) is to arrive based on the period and when the latest clock edge was received. Timing changes can be detected when the clock edge arrives at a different time from the predicted time of arrival, and control processor 416 can determine the timing adjustment value based on, for example, a difference between the actual arrival time and the predicted arrival time of the clock edge.

As another example, control processor 416 can also monitor a phase relationship between host device clock 504 and a reference clock. The reference clock can include, for example, dongle clock 510, or a dedicated reference clock generated from local oscillator 506 and not used by other components of dongle 450. A dedicated reference clock can be provided to reduce the likelihood of the reference clock being contaminated by jitter, which can affect the accuracy of phase relationship measurement. In some examples, control processor 416 can maintain a record of a phase relationship between host device clock 504 and the reference clock, and can detect timing changes of host device clock 504 based on changes in the phase relationship. Control processor 416 can determine a timing adjustment value based on, for example, a difference between the latest phase relationship between host device clock 504 and the reference clock and a prior phase relationship between the two clocks. The timing adjustment value can then be used in a resynchronization process to change the timing of operations at dongle 450 and peripheral device 404 in response to the timing change of host device clock 504.

Figure 7B:
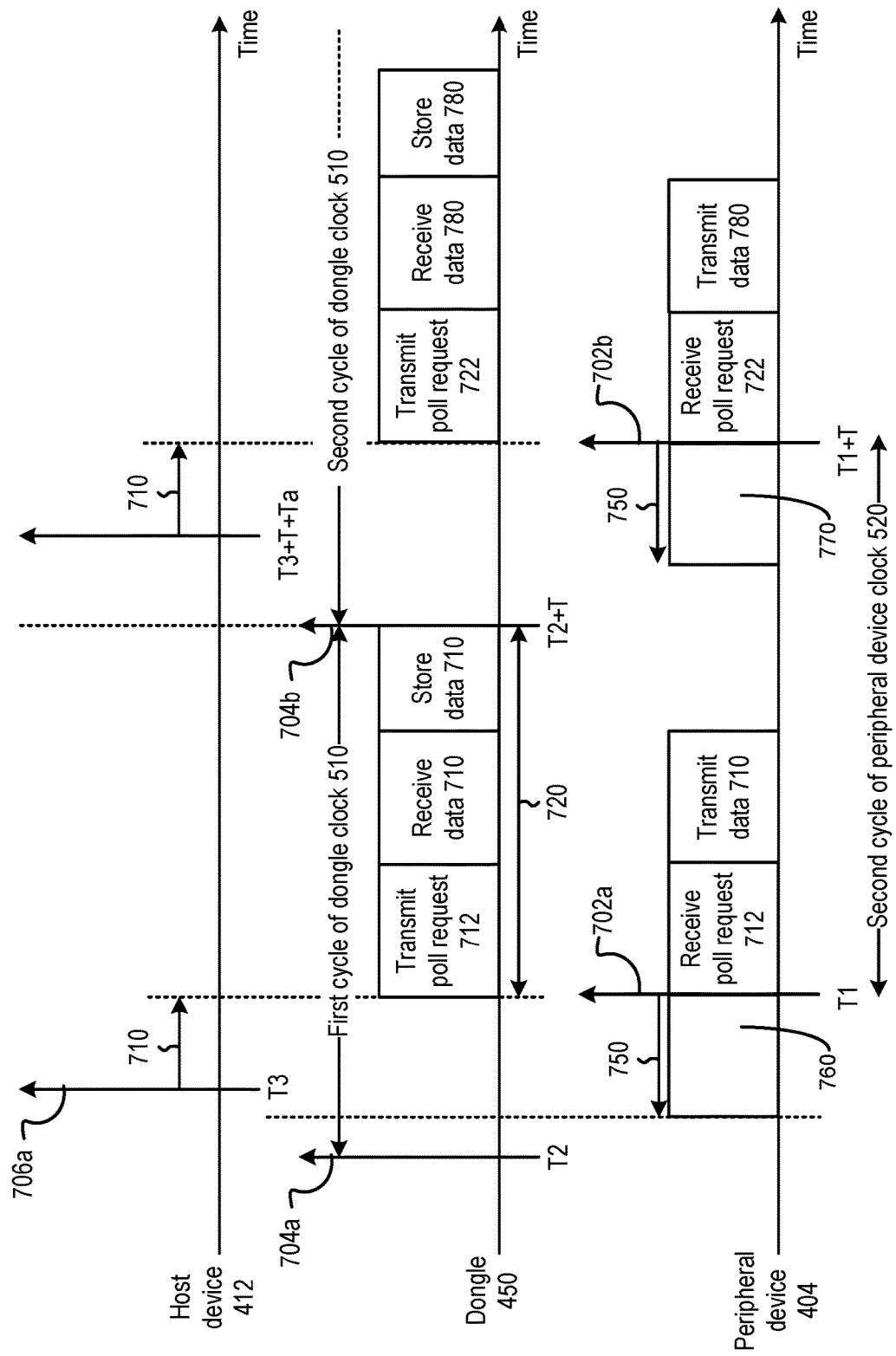

In some examples, control processor 416 may also indicate, in the standalone message to peripheral device 404, when peripheral device 404 is to apply the timing adjustment value. For example, referring to FIG. 7B, clock edge 706a of host device clock 504 arrives after peripheral device 404 starts process 760 to obtain and processing sensor data from sensor 430. The timing of process 760 (which has already begin) cannot be adjusted based on clock edge 706a. In this case, control processor 416 may defer the timing adjustment at both dongle 450 and peripheral device 404 to the next cycle. For example, control processor 416 can determine, based on the timing of clock edge 706a received in the first cycle of dongle clock 510 (between times T2 and T2+T), whether a clock drifting occurs. Clock drifting can lead to a change in the period of host device clock 504. Control processor 416 can determine a timing adjustment value Ta to account for the clock drift, and update the estimated arrival time of the next clock edge 706b of host device clock 504 at, for example, T3+T+Ta. Control processor 416 can set the time of transmission of a next poll request 722 in the second cycle of dongle clock 510 (starting from time T2+T) based on the estimated arrival time of the next clock edge 706b (e.g., by adding duration 710).

In some examples, control processor 416 may perform additional processing before resynchronizing its operation (and the operations of peripheral device 404) with host device clock 504. The additional processing may be configured to reduce the number of instances of the resynchronization processes, which can improve the stability of operations of dongle 450 and peripheral device 404. In some examples, control processor 416 may determine whether the timing change of host device clock 504 exceeds a threshold, and perform the resynchronization process (e.g., changing the timing of transmission of poll request and transmitting the timing adjustment value to peripheral device 404) if the timing change exceeds the threshold. In some examples, control processor 416 may also perform averaging of a number of prior instances of timing changes of host device clock 504 (e.g., based on a number of prior clock edges of host device clock 504), and perform resynchronization if the average (rather than just one instance) timing change exceeds a threshold. Such arrangements enable the system to only respond to relatively large and long-term timing change of host device clock 504 (e.g., caused by clock drifting) while ignoring other smaller and short-term timing changes of host device clock 504 (e.g., caused by clock jitter), to reduce the disturbances to the operations of dongle 450 and peripheral device 404.

In addition, control processor 416 can also indicate, in the standalone message, peripheral device 404 to update the timing of a new process 770 of obtaining sensor data 780 in the second cycle of peripheral device clock 520 based on the timing adjustment value. Upon receiving the standalone message, control processor 432 of peripheral device 404 can update the estimation of when to receive poll request 722 (time T1+T) based on the timing adjustment value, and update the timing of process 760 so that it starts at a duration of 750 before the reception of poll request 722 at time T1+T. At time T1+T, control processor 432 can generate a radio notification interrupt corresponding to clock edge 702b of the third cycle of peripheral device clock 520. Control processor 432 can control wireless interface 410 to enter RX mode to receive poll request 722 from dongle 450, and then transmit data 780 to dongle 450 in response to the poll request 722.

In some examples, in addition to a timing adjustment value and when to apply the timing adjustment value, control processor 416 can include other information in the message. For example, the message may include an opcode that indicates to control processor 432 that the message is intended for peripheral device 404 (other than other peripheral devices) and carries timing adjustment information. The message may also include a measurement of random uncertainties (e.g., jitter) of host device clock 504 (e.g., in the units of parts per million (ppm)). The measurement information can be obtained from, for example, host device 412

(and/or hardware processor 402). In some examples, control processor 416 can also perform statistical analysis on a record of clock periods of host device clock 504 to obtain the uncertainty measurement.

Synchronization of Multiple Peripheral Devices

In some examples, dongle 450 can be configured to receive sensor data from multiple peripheral devices and provide the sensor data to hardware processor 402 of computer system 460. Referring back to the example of FIG. 1, dongle 450 can receive sensor data from multiple peripheral devices including, for example, computer mouse 130, keyboard 140, and microphone 150, to enable the user to interact with host computing device 110 using different methods.

Figure 8:
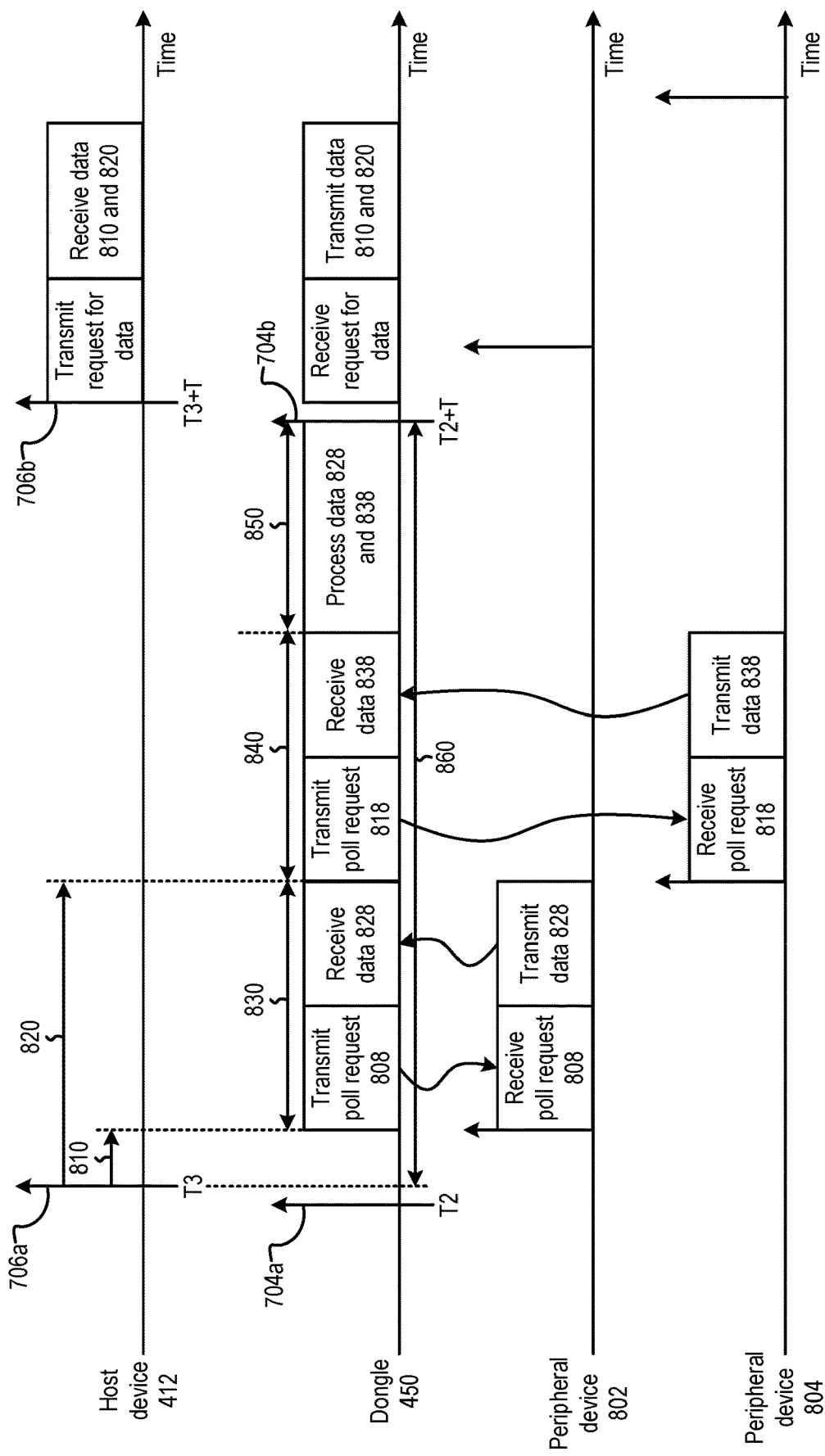
FIG. 8 shows a time division multiple access scheme used for wireless and wired data transfer, according to certain examples of the present disclosure.

In some examples, dongle 450 can be configured to communicate with each of computer mouse 130, keyboard 140, and microphone 150 using a time division multiple access (TDMA) scheme, in which dongle 450 establishes a wireless connection with each peripheral device simultaneously using wireless interface 406 (and wireless transceiver 413), but initiates acquisition of sensor data with each peripheral device at different times. The initiation of acquisition of sensor data from each peripheral devices can also be synchronized with host device clock 504 and with dongle clock 510. FIG. 8 illustrates an example of a TDMA scheme. In FIG. 8, within a first cycle of dongle clock 510 (defined by T2 and T2+T), dongle 450 may initiate acquisition of sensor data from peripheral device 802 by transmitting poll request 808 via a wireless connection. The transmission of poll request 808 can take place after a delay 810 has elapsed from clock edge 706a (at time T3) of host device clock 504. Within the first cycle of dongle clock 510, dongle 450 may also initiate acquisition of sensor data from peripheral device 804 by transmitting poll request 818 via another wireless connection. The transmission of poll request 818 can take place after a delay 820 has elapsed from clock edge 706a. Both peripheral devices 802 and 804 can also synchronize their operations (e.g., generation of radio notification interrupts, collection of sensor data, entry of RX mode to listen for poll requests, transmission of sensor data, etc.) with the poll requests received from dongle 450 (and with host device clock 504), and can transmit sensor data (e.g., sensor data 828 from peripheral device 802, sensor data 838 from peripheral device 804) back to dongle 450 at different times in response to the respective poll requests 808 and 818. Dongle 450 may receive data 828 and 838 and process the data before the second cycle of dongle clock 510 arrives at time T2+T. Host device 412 may transmit a read request at time T3+T, and dongle 450 can transmit data 828 and 838 collected from peripheral devices 802 and 804 to host device via bus 415.

As discussed above, delays 810 and 820 can be used to schedule initiation of sensor data acquisition (e.g., by transmitting a poll request) from each peripheral device, to allow each peripheral device to take turn in transmitting sensor data to dongle 450. In the example of FIG. 8, to synchronize the transmission of poll requests with the dongle clock 510 (in addition to host device clock 504), dongle 450 can determine both delay 810 and delay 820 based on processing time 830 (for transmission of poll request 808 and reception of data 828), processing time 840 (for transmission of poll request 818 and reception of data 838), processing delay 850 (for processing of data 828 and 838), and the timing of clock edge 704b of dongle clock 510 (which starts the second cycle of dongle clock 510). For example, assuming that clock edge 706a of host device clock 504 and clock edge 704b of dongle clock 510 are separated by a duration 860, delays 810 and 820 can be determined based on the following equations:

Delay 810=Duration 860−Processing Time 830−Processing Time 840−Processing Time 850   (Equation 2)

Delay 820=Duration 860−Processing Time 840−Processing Time 850   (Equation 3)

To reduce signal interference and collision between peripheral devices 802 and 804, one of the peripheral devices can be configured to stop transmitting radio signals when the other peripheral device is in communication with dongle 450. For example, when peripheral device 802 transmits data 828 to dongle 450, peripheral device 804 can be configured to remain radio silent and not to transmit radio signals. In some examples, the wireless interface of each peripheral device can be turned on only within a certain period after receiving the radio notification interrupt signal (to enter RX mode to listen for poll request and to transmit sensor data in response to the poll request), and can be turned off outside of that period, to avoid interfering or colliding with other peripheral device that is in the midst of transmitting sensor data to dongle 450.

In addition, the TDMA and polling scheme described in FIG. 8 can be used to provide prioritization between peripheral devices. Prioritization can be useful to process input data transmitted by peripheral devices associated with different applications, which may have different delay requirements. For example, peripheral device 802 can be a computer mouse used to provide control for a gaming application, which may require the computer system to respond in real time to the input data provided by peripheral device 802 and can tolerate for a higher latency for data transmission to host device 412. On the other hand, peripheral device 804 can be an audio speaker for an audio streaming application. The audio speaker may have a buffer to store audio data to be played, and can tolerate a higher latency for data transmission from the host to the audio speaker (as long as the buffer is not exhausted). In this example, the transmission of input data from the computer mouse to host device 412 can be prioritized over the transmission of output data from host device 412, to minimize the latency for data transmission from peripheral device 802 to host device 412.

To perform prioritization, within duration 860 the poll request for peripheral device 802 can be transmitted first (and synchronized with clock edge 706a of host device 412), followed by the poll request for peripheral device 804. Such arrangements can reduce the delay between when sensor data (e.g., data 828) is acquired at peripheral device 802 and when the sensor data is transmitted to dongle 450. On the other hand, the polling of peripheral device 804 can be performed subsequent to dongle 450 receiving the input data (e.g., data 828) from peripheral device 802. The polling can also be synchronized with clock edge 706a of host device 412, but the processing time 830 for polling and receiving data from peripheral device 802 can add to the delay between when peripheral device 804 acquires sensor data and when the sensor data is transmitted to dongle 450.

A Dongle with Multiple Transceivers

Although TDMA and polling schemes of FIG. 8 enable dongle 450 to receive sensor data from multiple peripheral devices, the polling scheme can pose challenges to the wireless data transfer between the peripheral devices and the dongle in various ways, despite the improvement in data transfer delay with techniques of synchronized polling described above.

First, a number of peripheral devices connected to dongle 450 can be limited. For example, referring back to FIG. 8, dongle 450 has finite duration 860 between two clock edges of host device 412 (clock edges 706*a* and 706*b*) to poll and receive data from each peripheral device. The polling and reception of data takes finite amount of processing time for each peripheral device (e.g., processing time 830 for peripheral device 802, processing time 840 for peripheral device 804, etc.), and the finite duration 860 can set an upper limit on how many peripheral device can sequentially get polled and transmit data to dongle 450 within duration 860. For example, the sum of processing times (e.g., processing times 830, 840, 850, etc.) of each peripheral device cannot exceed duration 860 such that dongle 450 can receive and process the input data from each of the polled peripheral device before the next clock edge (e.g., clock edge 704*b*) of the dongle clock arrives. The limit on the number of peripheral devices wirelessly connected to dongle 450 can have significant impact on user experience. As an illustrative example, dongle 450 may operate on a system with a very limited number of USB connectors such that the system can only be connected to a single dongle 450, which in turn can only wirelessly connect with a limited number of peripheral devices. If the number of peripheral devices wirelessly allowed to wirelessly connect to dongle 450 is small, the ways by which the user interact with the system may be severely limited, which not only reduces the utility of the system but also degrades user experience.

In addition, a polling scheme can introduce delay in data transmission of each peripheral device. For example, since each peripheral device needs to take turn and wait for the polling signal in order to transmit data to dongle 450, the waiting time for the polling signal adds delay to the transmission of data. The delay be acceptable to some applications but unacceptable for some other applications. As an example, the delay may be acceptable for streaming of audio and video data as long as the system can buffer sufficient amount of data to be consumed by the display and/or audio player while waiting for new wireless audio/video data. But the delay may be unacceptable for an input device (e.g., a mouse, a joystick, etc.) used in applications that require high-frequency interaction between the user and the system (e.g., gaming, instrumentation control, etc.), where the input device needs to transmit new user input data as soon as after the input data is generated to support the high-frequency interaction between the user and the system.

Moreover, having multiple peripheral devices to take turn in performing wireless communication with a single transceiver (e.g., under a polling scheme) of dongle 450 may also create a situation where the data transmission by one peripheral device impacts the data transmission of some other peripheral devices. For example, when the bandwidth of the transceiver is exceeded, and the data transmission of one device is prioritized (e.g., by providing a larger polling window) over other non-prioritized devices, the delay in the data transmission of the non-prioritized devices can be impacted (and increased) by the prioritized devices. For example, in a case where a gaming mouse and devices for audio and/or video streaming communicate with a single transceiver of dongle 450, the data transmission delay experienced by the audio and/or video streaming devices may increase as a result of prioritizing the user input data transmission by the gaming mouse.

In some examples, to alleviate the aforementioned challenges posed by a polling scheme, a dongle can adopt a hybrid TDMA and frequency division multiple access (FDMA) scheme to process input data from multiple peripheral devices. For example, a dongle can be configured to include multiple wireless transceivers, with each wireless transceiver configured to communicate with one or more peripheral devices using a different frequency channel. The wireless transceivers can also be dedicated to different peripheral devices (or different sets of peripheral devices having different delay tolerances). For example, a first wireless transceiver can be dedicated to data transmission from a user input device (e.g., a gaming mouse, an instrumentation control device, etc.), whereas a second wireless transceiver can be dedicated to data transmission from video and/or audio data streaming devices.

The multiple wireless transceivers allow the dongle to poll and receive input data from multiple peripheral devices in parallel (using FMDA) and/or sequentially (using TDMA). The parallelism increases a number of peripheral devices allowed to transmit input data within each host device clock cycle, while reducing the wait time and the data transmission delay experienced by each peripheral device. Moreover, by having dedicated wireless transceivers for different peripheral devices (or different sets of peripheral devices), the likelihood of prioritized devices impacting the data transmission of non-prioritized devices can be reduced.

Figure 9:
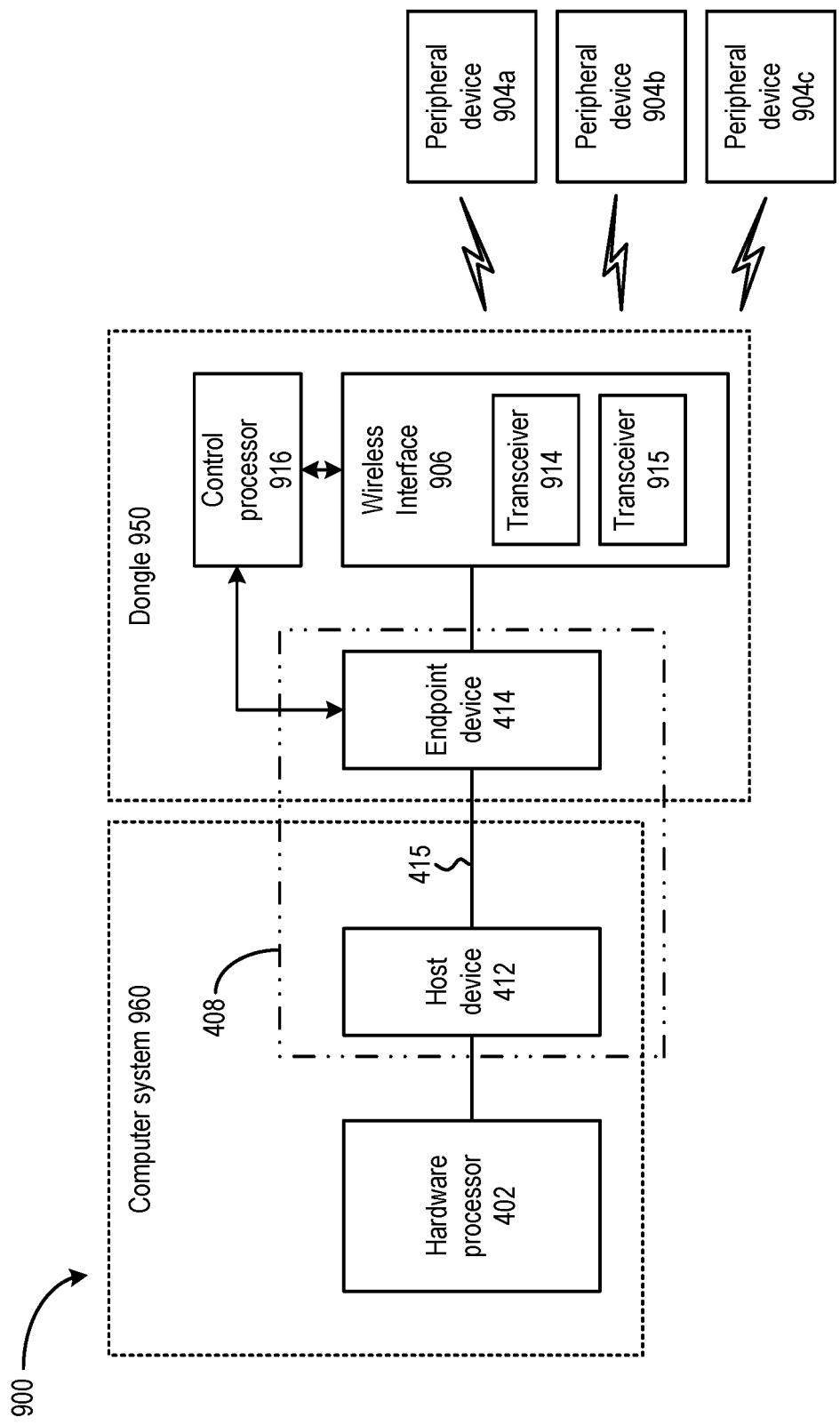
FIG. 9 shows a communication system between a host computing device and multiple peripheral devices, according to certain examples of the present disclosure.

FIG. 9 illustrates an example of a communication system 900 that employs a hybrid TDMA and FDMA scheme. As shown in FIG. 9, communication system 900 can provide data transfer between hardware processor 402 of FIG. 4 and peripheral devices 904*a*, 904*b*, and 904*c* (e.g., peripheral devices 130-150). Communication system 900 may include a wireless interface 906 and wired interconnect 408 (of FIG. 4) on the side of hardware processor 402 (e.g., as part of computer 110 and/or systems 200 and 300). Wireless interface 906 can include multiple wireless transceivers such as, for example, transceivers 914 and 915. Each of peripheral devices 904*a*-*c* also include a wireless interface (not shown in FIG. 9) to communicate with wireless interface 906 via transceivers 914 and 915. Each transceiver may include, for example, an antenna, power amplifiers, low noise amplifiers, mixers, analog-to-digital converters (ADC), etc., Over wireless interface 906 and wired interconnect 408, data can be transferred between hardware processor 402 and peripheral devices 904*a*-*c*. Wireless interface 906 and endpoint device 414 can be part of a dongle 950. Dongle 450 may further include a control processor 916 to control the operations of wireless interface 906 and endpoint device 414 including, for example, operations for data transfer between hardware processor 402 and peripheral devices 904*a*-*c*. Dongle 450 can form one or more piconets with peripheral devices 904*a*-*c*, and receive sensor data from each of the peripheral devices in multiple connection events. Control processor 916 can operate transceivers 914 and 915 of wireless interface 906 to perform wireless data transfer with peripheral devices 904*a*-*c* based the same wireless protocol or different wireless protocols including, for example, Bluetooth®, BLE, etc. Control processor 916 can also synchronize the wireless data transfer with host device clock 504 based on techniques discussed above. Although FIG. 9 shows that control processor 916 is a single entity, it is understood that control processor 916 can have multiple entities, and some of the entities can be part of transceiver 914 and transceiver 915.

Figure 10:
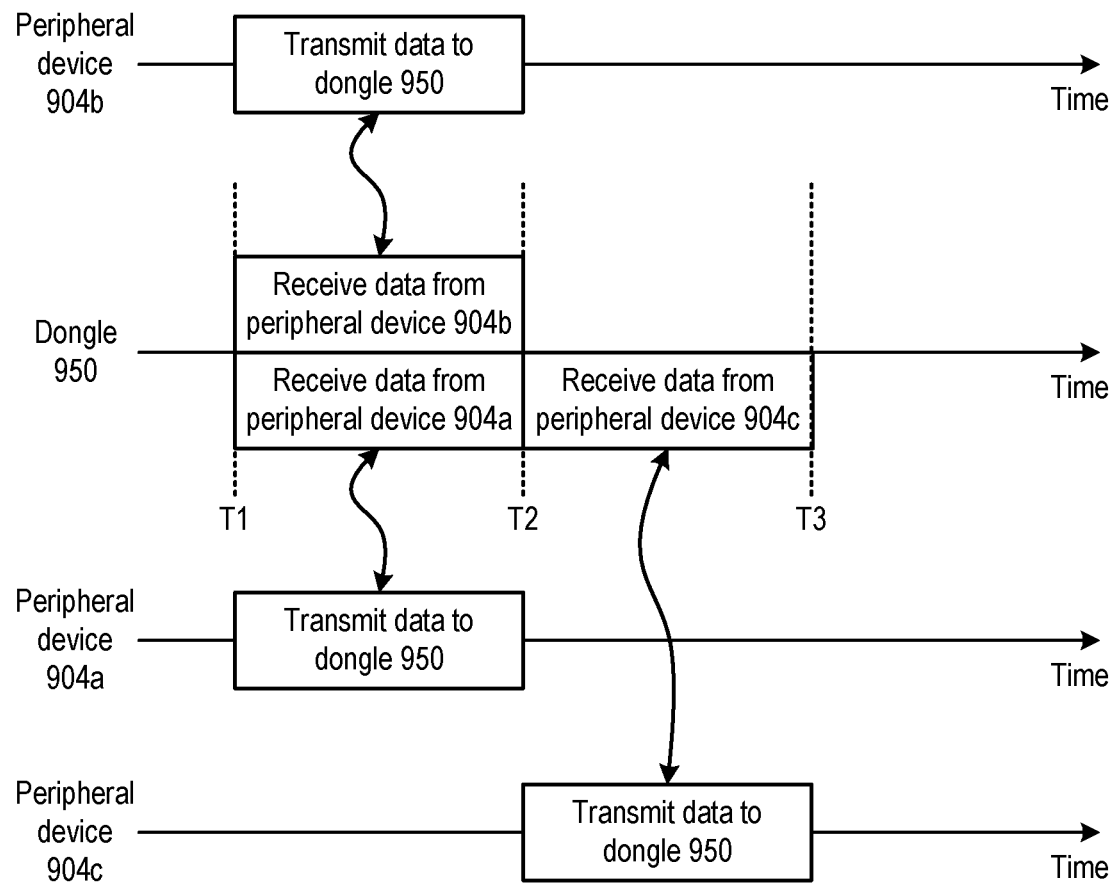
FIG. 10 shows operations of the communication system of FIG. 9, according to certain examples of the present disclosure.

In some examples, control processor 916 can operate transceivers 914 and 915 to perform wireless data transfer with at least some of peripheral devices 904*a*-*c* in parallel. FIG. 10 illustrates an example of wireless data transfer between dongle 950 and peripheral devices 904*a*-*c*. As shown in FIG. 10, control processor 916 (of dongle 950) can perform wireless data transfer with peripheral device 904a using wireless transceiver 914 between times T1 and T2. Control processor 916 can also perform wireless data transfer with peripheral device 904b using wireless transceiver 915 between times T1 and T2, and with peripheral device 904c also using wireless transceiver 915 between times T2 and T3.

Moreover, to reduce the likelihood of signal collision and interference, control processor 916 can configure transceivers 914 and 915 to operate in a FDMA scheme, in which different wireless carrier frequencies are used to perform parallel wireless data transfer between times T1 and T2. In some example, control processor 916 can configure transceivers 914 and 915 can configure transceivers 914 and 915 to use different frequency hopping sequences to perform wireless data transfer, such that different wireless carrier frequencies are used to perform data transfer at transceivers 914 and 915 at any time point. The wireless data transfer operations may include, for example, transmission of poll request and reception of sensor data in response at dongle 950, entry into RX mode to listen for poll request and transmission of sensor data in response to the poll request at peripheral devices 904a-c, etc. In some examples, a TDMA scheme may also be used such that transceivers 914 and 915 can be used to communicate with different peripheral devices at different times using the same wireless carrier frequency.

In some examples, transceivers 914 and 915 can be controlled by separate control circuitries (and housed with a single dongle) and/or being part of two different dongles and coupled with two different endpoint devices. For example, as described above, some of the components/entities of control processor 916 can be embedded into transceivers 914 and 915. The two endpoint devices may be coupled with a single host device, or separate host devices. The two control circuitries may be configured to initiate the same frequency hopping sequences (e.g., using the same seed value to generate a set of frequency values) at the two transceivers, which may lead to signal collision and interference between the two transceivers. To reduce signal collision and interference in an efficient manner, the two control circuitries can synchronize with each other to determine the frequency hopping sequences for the respective transceiver before or during the wireless data transfer with the peripheral devices via an information exchange process. For example, during startup the control circuitry for transceiver 914 can transmit, to the control circuitry for transceiver 915, a frequency hopping sequence to be implemented at for transceiver 914. The control circuitry for transceiver 915 may also transmit the frequency hopping sequence for transceiver 915 to the control circuitry for transceiver 914. In some examples, the exchange of information can be performed wirelessly using the transceivers. In some examples, the exchange of information can be performed using a wired interconnect that connects between the two transceivers. One of the control circuitries/endpoint devices (e.g., for transceiver 914) can adapt its frequency hopping sequence based on the received information to, for example, use a frequency hopping sequence that does not overlap with the frequency hopping sequence at the other transceiver at any time point, to reduce frequency overlapping and to avoid environmental interference.

In some examples, during the wireless data transfer, one of the control circuitries/endpoint devices can also monitor for interferences and, upon detecting substantial interferences, exchange frequency hopping sequence information with the other control circuitry, to enable the other control circuitry/endpoint device to update its frequency hopping sequence to reduce interference. In some examples, both control circuitries/endpoint devices can adapt their respective frequency hopping sequences based on the exchanged information to speed up the synchronization process, which allows settling on the respective frequency hopping sequences at both transceivers to start (or restart) the wireless data transfer as quickly as possible. Adapting the frequency hopping sequences at the transceivers quickly and not dependent on other devices/applications can be critical for applications that require high frequency interaction between the user and the computer (e.g., gaming control, instrumentation control, etc.), for which the tolerance for unresponsiveness from the computer (e.g., due to signal interference) can be low. For example, in a case where a first transceiver is used for lower priority application (e.g., streaming of audio/video data) and a second transceiver is used for receiving input data for high speed gaming, it is undesirable that the wireless data transmission of the second transceiver is interrupted by the first transceiver due to collision. By having the information exchange process, the second transceiver can adjust its frequency hopping sequence quickly based on the frequency hopping sequence being used in the first transceiver, such that the interruption to the wireless data transfer at the second transceiver for the higher priority gaming application can be minimized.

The hybrid TDMA and FDMA scheme in FIG. 10 can also include the techniques described above to reduce data transmission latency and to allow prioritization among the peripheral devices. For example, the transmission of poll request and reception of data from the peripheral devices, as well as transmission of data by the peripheral devices, can be synchronized with host device clock 504. Moreover, higher-priority peripheral devices can be polled first within cycle of host device clock, followed by lower-priority peripheral devices. For example, in FIG. 10, peripheral devices 904a and 904b can have higher priority than peripheral device 904c, and peripheral devices 904a and 904b can be polled before peripheral device 904c.

Compared with the TDMA scheme of FIG. 8 where each peripheral device must take turn in communicating with the dongle via a single wireless transceiver at the dongle, the parallel wireless data transfer provided by multiple transceivers 914 and 915 can reduce the wait time incurred at each peripheral device before the peripheral device transmits sensor data, which can further reduce the delay in transmitting sensor data to hardware processor 402. With such arrangements, the capability of a computer system in tracking the user's input can be improved, which can lead to better user experience.

Methods

Figure 11:
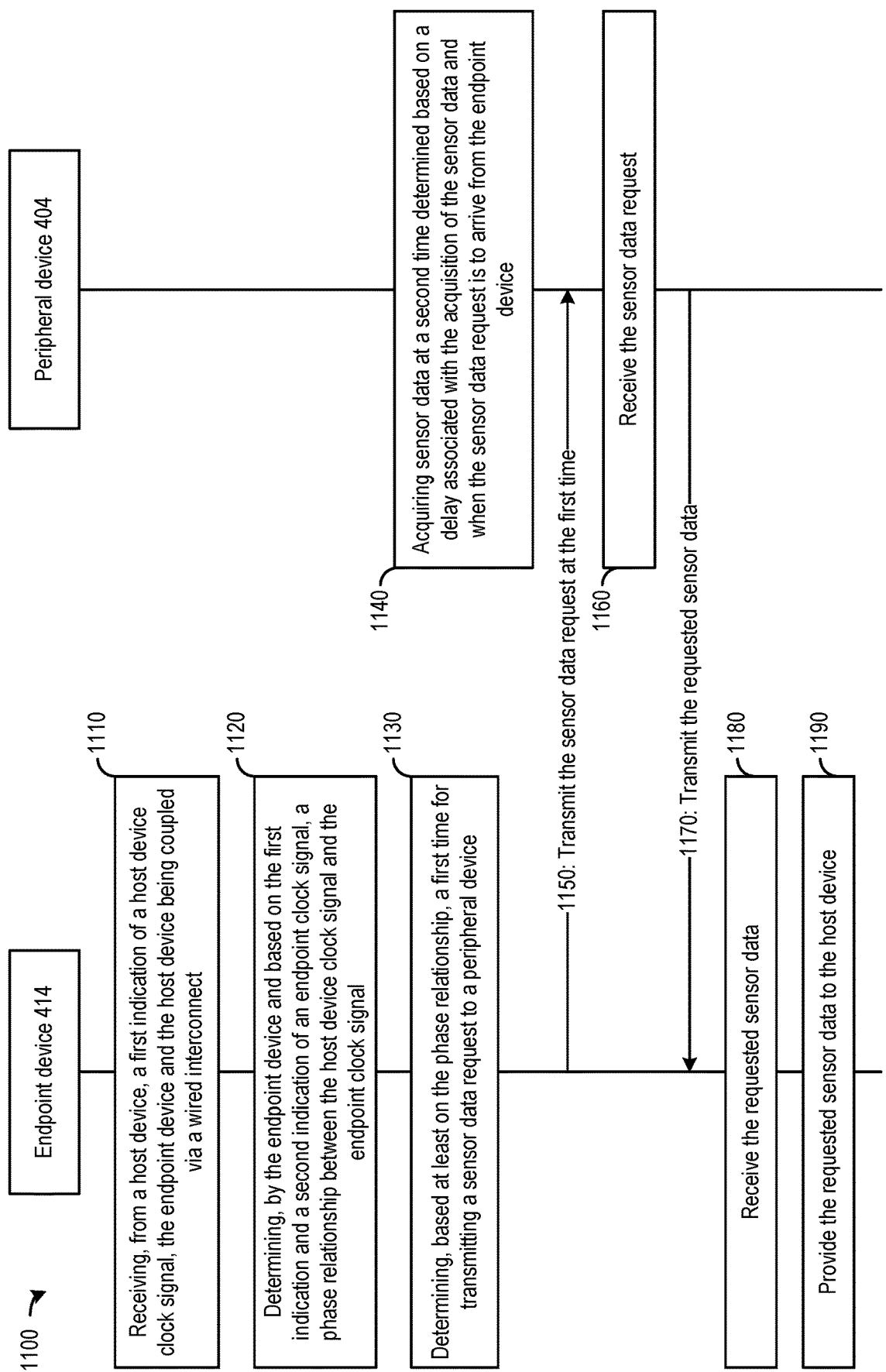
FIGS. 11 and 12 show flowcharts of operations of a computer system, according to certain examples of the present disclosure.

FIG. 11 shows a simplified flow diagram of method 1100 for performing wireless data transfer, according to some examples. Method 1100 can be performed by processing logic that may comprise hardware (circuitry, dedicated logic, etc.), software operating on appropriate hardware (such as a general purpose computing system or a dedicated machine), firmware (embedded software), or any combination thereof. In some examples, method 1100 can be performed by, for example, an endpoint device (e.g., endpoint device 414) and a peripheral device (e.g., peripheral device 404) of FIG. 4. Endpoint device can be coupled with a host device via a hardware interconnect including, for example, a USB bus. Method 1100 can be implemented using the techniques described above with respect to, for example, FIG. 7A, FIG. 7B, and FIG. 8-FIG. 10.

At step 1110, method 1100 can include receiving, by the endpoint device and from the host device, a first indication of a host device clock signal. The first indication may include, for example, a start of frame (SOF) signal which can be synchronized with a rising edge of the host device clock signal. The first indication can also be based on reception of an SOF data packet.

At step 1120, method 1100 can include determining, by the endpoint device and based on the first indication and a second indication of an endpoint clock signal, a phase relationship between the host device clock signal and the endpoint clock signal. The second indication can be a first rising edge of the endpoint clock signal after the rising edge of the host device clock signal corresponding to the first indication. The phase relationship can correspond to, for example, duration 740 of FIG. 7A and Equation 11.

At step 1130, method 1100 can include determining, based at least on the phase relationship, a first time for transmitting a sensor data request, such as a polling request, to a peripheral device. The determination of the first time allows the transmission of the sensor data request to be adjusted to account for change in the timing of the host device clock, which enables data transfer between the endpoint device and the host device to be synchronized with the host device clock signal. The first time (e.g., delay 710 of FIG. 7A) can be determined based on, for example, a total processing time of the sensor data request at the peripheral device (e.g., processing time 720 of FIG. 7A) and Equation 12.

At step 1140, method 1100 can include acquiring, at the peripheral device, sensor data at a second time determined based on a delay associated with the acquisition of the sensor data and when the sensor data request is to arrive from the endpoint device. The delay can include, for example, duration 750 of FIG. 7A. In some examples, duration 750 can also be determined based on expected timing of arrival of the sensor data request (e.g., polling request) from the endpoint device, such that the sensor data acquisition can complete before the arrival of the polling request, to synchronize the operation of the peripheral device with the endpoint device (and with the host device). The expected timing of arrival of the sensor data request can be determined based on, for example, the reception of acknowledgement signals from the endpoint device during the establishment of the wireless connection between the endpoint device and the peripheral device, when prior sensor data requests are received from the endpoint device, etc. Duration 750 can also be adjusted based on a timing adjustment value received as part of a standalone message from the endpoint device. The timing adjustment value can convey, for example, a change in the time of transmission of the sensor data request (e.g., delay 710 of FIG. 7A) at the endpoint device due to, for example, the drifting of host device clock signal, as part of the synchronization among the peripheral device, the endpoint device, and the host device.

At step 1150, method 1100 can include transmitting, by the endpoint device, the sensor data request wirelessly to the peripheral device at the first time. The wireless transmission can be based on, for example, the BLE protocol using a wireless transceiver coupled with the endpoint device.

At step 1160, method 1100 can include receiving, at the peripheral device, the sensor data request at the peripheral device. The peripheral device may enter an RX mode to listen for the sensor data request (e.g., a poll request) at the start of a peripheral device clock period indicated by a radio interrupt notification signal and to receive the sensor data request at step 1160.

At step 1170, method 1100 can include transmitting, by the peripheral device, the requested sensor data wirelessly to the endpoint device. The wireless transmission can be based on, for example, the BLE protocol using a wireless transceiver included in the endpoint device.

At step 1180, method 1100 can include receiving, at the endpoint device, the requested sensor data in response to the sensor data request transmitted at step 1150. The endpoint device can provide the sensor data to the host device by, for example, storing the sensor data at a register accessible by the host device at step 1190 before the start of the next host device clock cycle.

Figure 12:
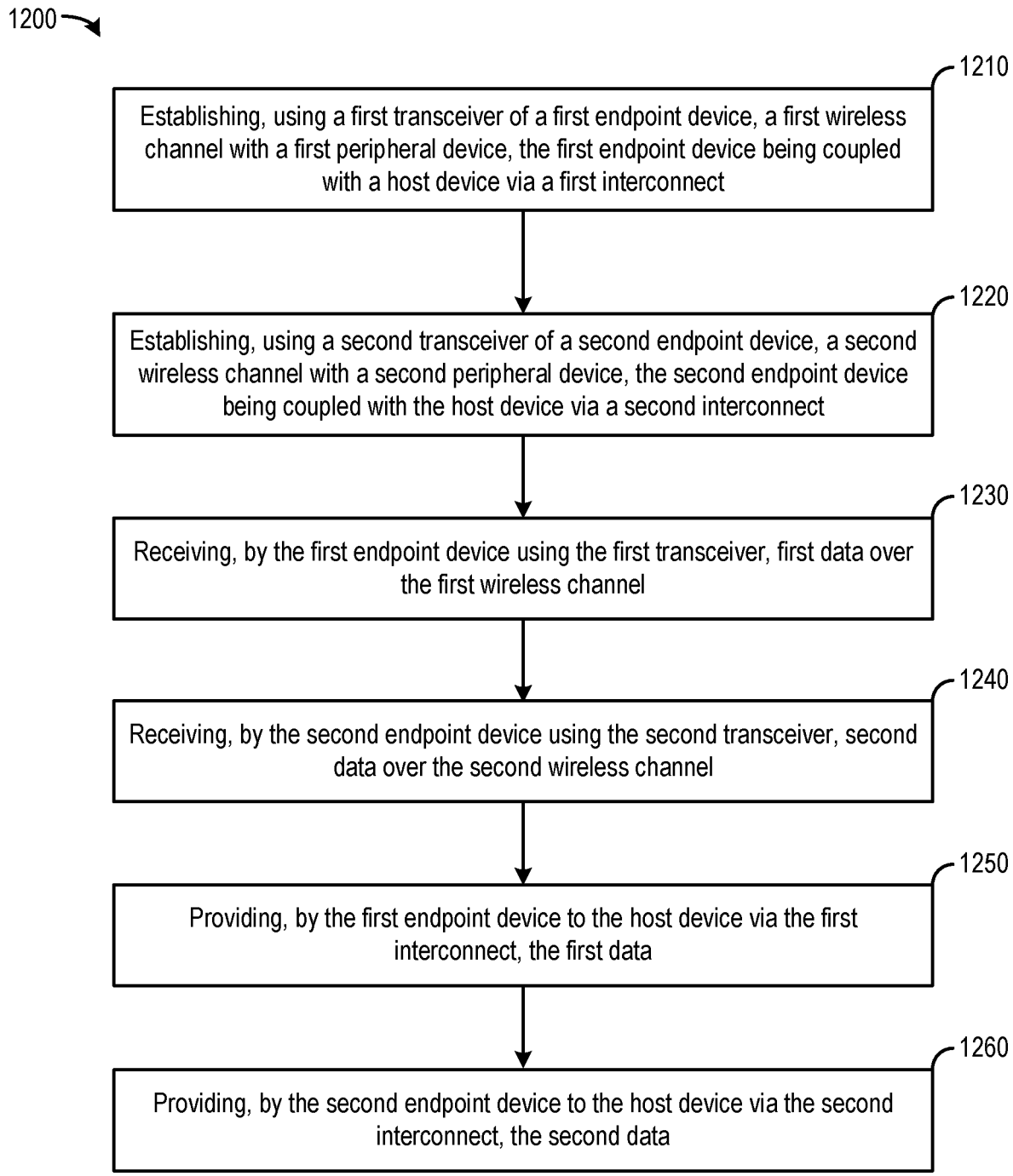

FIG. 12 shows a simplified flow diagram of method 1200 for performing wireless data transfer between a computer and multiple peripheral devices, according to some examples. Method 1200 can be performed by processing logic that may comprise hardware (circuitry, dedicated logic, etc.), software operating on appropriate hardware (such as a general purpose computing system or a dedicated machine), firmware (embedded software), or any combination thereof. In some examples, method 1200 can be performed by, for example, a single endpoint device of a single dongle (e.g., endpoint device 414 of dongle 950 of FIG. 9), and the single endpoint device is connected to a host device of the computer via a single interconnect (e.g., a USB bus). In some examples, method 1200 can also be performed by multiple endpoint devices of a single dongle or of multiple dongles, with each of the multiple endpoint devices being coupled with a host device via an interconnect. Method 1200 can be implemented using the techniques described above with respect to, for example, FIG. 7A, FIG. 7B, and FIG. 8-FIG. 10.

At step 1210, method 1200 can include establishing, using a first transceiver of a first endpoint device, a first wireless channel with a first peripheral device, the first endpoint device being coupled with a host device via a first interconnect. The first wireless channel can be a BLE wireless channel.

At step 1220, method 1200 can include establishing, using a second transceiver of a second endpoint device, a second wireless channel with a second peripheral device, the second endpoint device being coupled with the host device via a second interconnect. The second wireless channel can also be a BLE wireless channel.

In some examples, the two wireless channels can be established using the same set of frequency carriers, and the two transceivers can be controlled to transmit and receive data over the wireless channels according to a time-division multiple access (TDMA) scheme using a frequency carrier, and the first sensor data and the second sensor data are received from the endpoint device within different transmission periods. In some examples, the two wireless channels can be established using the different sets of frequency carriers. The two transceivers can be controlled to transmit and receive data over the wireless channels according to a frequency-division multiple access (FDMA) scheme. In some examples, the two transceivers can also be controlled to transmit and receive data over the wireless channels according to a hybrid of TDMA and FDMA schemes. For example, the two transceivers can also be controlled to transmit and receive data over the wireless channels according to different frequency hopping sequences such at any given time the two transceivers use carriers of different frequencies to perform data transmission and reception, but the two transceivers may also use carrier of the same frequency to perform data transmission and reception, albeit at different times.

In some examples, the two wireless transceivers can be controlled by a single endpoint device and/or control circuitry such that the first endpoint device and the second endpoint device are identical, and the first interconnect and the second interconnect are identical, and the single endpoint device can coordinate the establishment of the wireless channels at the two wireless transceivers to minimize overlapping and interference between the two wireless channels. In some examples, the two wireless transceivers can be controlled by two separate endpoint devices, and the two endpoint devices can exchange information about the respective wireless channels such that at least one of the endpoint devices can adapt its respective wireless channel to minimize overlapping and interference. For example, the first endpoint device can transmit, to the second endpoint device, information about a first frequency hopping sequence to be implemented at the first wireless transceiver for the first wireless channel. The second endpoint device can determine the second frequency hopping sequence for the second wireless channel based on the first frequency hopping sequence to reduce or eliminate overlap and interference between the two wireless channels, such that the first sensor data is received using a different wireless carrier frequency from the second sensor data at any time within the transmission period. The exchange of information can take place during startup and/or during wireless data transfer.

In some aspects, the first transceiver is operated to establish the first wireless channel using a first wireless protocol. The second transceiver is operated to establish the second wireless channel using a second wireless protocol. The first and second wireless protocols can be the same protocol or different protocols including, for example, BLE.

At step 1230, method 1200 can include receiving, by the first endpoint device using the first transceiver, first data over the first wireless channel. The first data may include, for example, sensor data indicating a movement of a mouse along x and y directions.

At step 1240, method 1200 can include receiving, by the second endpoint device using the second transceiver, second data over the second wireless channel. The second data may include, for example, audio/video stream data.

At step 1250, method 1200 can include providing, by the first endpoint device to the host device via the first interconnect, the first data. For example, the first endpoint device can store the first data at a register accessible by the host device, which then acquires the first data from the register.

At step 1260, method 1200 can include providing, by the second endpoint device to the host device via the second interconnect, the second data. For example, the second endpoint device can store the second data at a register accessible by the host device, which then acquires the second data from the register.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus comprising:
   a wireless transceiver;
   a memory device that stores a set of instructions; and
   a hardware processor configured to execute the set of instructions to perform:
   receiving, from a host device, a first indication of a host device clock signal, the apparatus and the host device being coupled via a wired interconnect;
   determining, based on the first indication and a second indication of an endpoint device clock signal, a phase relationship between the host device clock signal and the endpoint device clock signal;
   determining, based at least on the phase relationship, a first time for transmitting a sensor data request to a peripheral device of a computer;
   transmitting, using the wireless transceiver, the sensor data request to the peripheral device at the first time;
   receiving, from the peripheral device, the requested sensor data; and
   providing the requested sensor data to the host device via the wired interconnect as input data to the computer,
   wherein the first indication of the host device clock signal is received at a second time; and
   wherein the first time for transmitting the sensor data request is determined based on the second time and a pre-determined delay between when the apparatus initiates an acquisition of the sensor data and when the sensor data becomes available at the apparatus for transfer over the wired interconnect.

2. The apparatus of claim 1, wherein the hardware processor is further configured to perform:
   determining, based on the host device clock signal, a third time when the apparatus is to receive a read request from the host device for the sensor data, wherein the first time for acquiring the sensor data from the peripheral device is determined such that the sensor data is acquired by the apparatus before the second time.

3. The apparatus of claim 1, wherein transmitting the sensor data request to the peripheral device comprises transmitting, by the apparatus to the peripheral device using the wireless transceiver, a poll request;
wherein the hardware processor is further configured to perform:
receiving, from the peripheral device, and using the wireless transceiver, a poll response including the sensor data; and
processing the poll response to extract the sensor data.

4. The apparatus of claim 3, wherein transmitting the poll request to the peripheral device at the first time enables the peripheral device to determine at least one of: a third time of acquiring next sensor data, or a fourth time of monitoring for a next poll request from the peripheral device for transmission of the next sensor data.

5. The apparatus of claim 4, wherein the poll request further includes accuracy information of the host device clock signal to determine the at least one of the third time of acquiring next sensor data or the fourth time of monitoring for a next poll request from the peripheral device.

6. The apparatus of claim 4, wherein the hardware processor is further configured to perform:
determining a change in the phase relationship between the host device clock signal and the endpoint device clock signal;
responsive to determining that the change in the phase relationship exceeds a threshold:
generating a command including information about the change in the phase relationship; and
transmitting, using the wireless transceiver, the command to the peripheral device to enable the peripheral device to update the at least one of the third time of acquiring next sensor data or the fourth time of monitoring for a next poll request from the peripheral device.

7. The apparatus of claim 6, wherein the command further includes accuracy information of the host device clock signal and indicates when to update the at least one of the third time of acquiring next sensor data or the fourth time of monitoring for a next poll request from the peripheral device.

8. The apparatus of claim 1, wherein the hardware processor is further configured to perform:
receiving, using the wireless transceiver and from the peripheral device, a request to establish a wireless channel; and
transmitting, using the wireless transceiver, an acknowledgement to the peripheral device at a third time determined based on the second time when the first indication of the host device clock signal is received.

9. The apparatus of claim 1, wherein:
the peripheral device is a first peripheral device;
the sensor data is first sensor data;
the hardware processor is further configured to perform:
determining a third time to initiate acquisition of second sensor data from a second peripheral device, the third time also determined based on the phase relationship between the host device clock signal and the endpoint device clock signal; and
initiating the acquisition of the second sensor data from the second peripheral device at the determined third time.

10. The apparatus of claim 1, wherein the first indication of the host device clock signal includes an interrupt signal.

11. The apparatus of claim 1, wherein the wired interconnect comprises one or more Universal Serial Busses (USBs).

12. An apparatus, comprising:
a wireless transceiver;
a sensor;
a memory device that stores a set of instructions; and
a hardware processor configured to execute the set of instructions to perform:
receiving, using the wireless transceiver and from an endpoint device coupled with a computer, a sensor data request at a first time;
determining, based on the first time, a second time to receive a next sensor data request;
determining a delay associated with acquiring sensor data from a sensor;
determining, based on the delay and the second time, a third time to initiate the acquisition of the sensor data from the sensor;
acquiring the sensor data from the sensor at the third time;
transmitting, using the wireless transceiver, the sensor data to the endpoint device as input data to the computer;
receiving, from the endpoint device, a command including information about a change in a phase relationship; and
determining the third time to initiate acquisition of sensor data from the sensor based on the command.

13. The apparatus of claim 12, wherein the endpoint device is coupled with a host device via a wired interconnect; and
wherein the first time is determined based on a phase relationship between a host device clock signal provided to the host device and an endpoint device clock signal provided to the endpoint device.

14. The apparatus of claim 13, wherein the command further includes accuracy information of the host device clock signal; and
wherein the third time to initiate acquisition of sensor data is determined based on the accuracy information.

15. The apparatus of claim 12, wherein the first time is determined based on when the endpoint device is to receive a read request from a host device for the sensor data.

16. An apparatus comprising:
a dongle coupled with a host device of a computer via a wired interconnect; and
a peripheral device;
wherein the dongle is configured to perform:
receiving, from the host device, a first indication of a host device clock signal;
determining, based on the first indication and a second indication of an endpoint clock signal, a phase relationship between the host device clock signal and the endpoint clock signal;
determining, based at least on the phase relationship, a first time for transmitting a sensor data request to a peripheral device of a computer; and
transmitting the sensor data request wirelessly to the peripheral device at the first time;
wherein the peripheral device is configured to perform:
acquiring sensor data at a second time determined based on a delay associated with the acquisition of the sensor data and when the sensor data request is to arrive from the dongle;

receiving, wirelessly from the dongle, the sensor data request; and transmitting, wirelessly and in response to the sensor data request, the requested sensor data; and wherein the dongle is further configured to perform:
  receiving, from the peripheral device wirelessly, the requested sensor data;
  providing the requested sensor data to the host device via the wired interconnect as input data to the computer;
  determining a change in the phase relationship between the host device clock signal and the endpoint device clock signal;
  responsive to determining that the change in the phase relationship exceeds a threshold:
    generating a command including information about the change in the phase; and
    transmitting, to the peripheral device, the command to enable the peripheral device to update the at least one of a third time of acquiring next sensor data or a fourth time of monitoring for a next poll request from the peripheral device.

17. The apparatus of claim 16, wherein transmitting the sensor data request to the peripheral device comprises transmitting a poll request;
  wherein the dongle is further configured to perform:
    receiving, from the peripheral device, a poll response including the sensor data; and
    processing the poll response to extract the sensor data.

* * * * *